(12) United States Patent
Davis et al.

(10) Patent No.: US 9,747,561 B2
(45) Date of Patent: Aug. 29, 2017

(54) COMPUTATIONAL SYSTEMS AND METHODS FOR LINKING USERS OF DEVICES

(75) Inventors: Marc E. Davis, San Francisco, CA (US); Matthew G. Dyor, Bellevue, WA (US); William Gates, Redmond, WA (US); Xuedong Huang, Bellevue, WA (US); Roderick A. Hyde, Redmond, WA (US); Edward K. Y. Jung, Bellevue, WA (US); Royce A. Levien, Lexington, MA (US); Richard T. Lord, Tacoma, WA (US); Robert W. Lord, Seattle, WA (US); Qi Lu, Bellevue, WA (US); Mark A. Malamud, Seattle, WA (US); Nathan P. Myhrvold, Bellevue, WA (US); Satya Nadella, Clyde Hill, WA (US); Daniel Reed, Redmond, WA (US); Harry Shum, Medina, WA (US); Clarence T. Tegreene, Bellevue, WA (US); Lowell L. Wood, Jr., Bellevue, WA (US)

(73) Assignee: ELwha LLC, Bellevue, WA (US)

( * ) Notice: Subject to any disclaimer, the term of this patent is extended or adjusted under 35 U.S.C. 154(b) by 31 days.

(21) Appl. No.: 13/199,832

(22) Filed: Sep. 7, 2011

(65) Prior Publication Data

US 2013/0061050 A1    Mar. 7, 2013

(51) Int. Cl.
| | | |
|---|---|---|
| G06F 15/16 | (2006.01) |
| H04L 9/28 | (2006.01) |
| G06Q 10/06 | (2012.01) |
| G06Q 10/10 | (2012.01) |
| G06Q 40/00 | (2012.01) |
| G06Q 50/00 | (2012.01) |
| G06Q 50/30 | (2012.01) |

(52) U.S. Cl.
CPC .......... *G06Q 10/06* (2013.01); *G06Q 10/107* (2013.01); *G06Q 40/00* (2013.01); *G06Q 50/01* (2013.01); *G06Q 50/30* (2013.01)

(58) Field of Classification Search
CPC ...... G06Q 50/01; G06Q 50/30; G06Q 10/107; G06Q 10/06; G06Q 40/00
USPC ...................................................... 713/168
See application file for complete search history.

(56) References Cited

U.S. PATENT DOCUMENTS

| | | |
|---|---|---|
| 5,870,473 A | 2/1999 | Boesch et al. |
| 5,878,141 A | 3/1999 | Daly et al. |
| 5,944,787 A | 8/1999 | Zoken |

(Continued)

OTHER PUBLICATIONS

Dancu, John. Jul. 21, 2008. "Using Identity and Age Verification within Social Networking Sites". Retrieved on Apr. 13, 2014 from <http://cyber.law.harvard.edu/sites/cyber.law.harvard.edu/files/IDology_ISTTFTAB_submission.pdf>.*

(Continued)

*Primary Examiner* — Dustin Nguyen
*Assistant Examiner* — Juan C Turriate Gastulo

(57) ABSTRACT

Methods, apparatuses, computer program products, devices and systems are described that carry out accepting device-identifier data corresponding to at least one communication device; accepting network-participation identifier data associated with a verified real-world user associated with the at least one communication device; and assigning a unique identifier at least partly based on the device-identifier data and the network-participation identifier data.

49 Claims, 16 Drawing Sheets

(56) References Cited

U.S. PATENT DOCUMENTS

| | | |
|---|---|---|
| 5,978,373 A | 11/1999 | Hoff et al. |
| 5,987,440 A | 11/1999 | O'Neil et al. |
| 5,988,497 A | 11/1999 | Wallace |
| 6,018,761 A | 1/2000 | Uomini |
| 6,141,010 A | 10/2000 | Hoyle |
| 6,763,020 B1 * | 7/2004 | Hon .................... 370/356 |
| 7,016,866 B1 | 3/2006 | Chin et al. |
| 7,246,315 B1 | 7/2007 | Andrieu et al. |
| 7,318,049 B2 | 1/2008 | Iannacci |
| 7,334,184 B1 | 2/2008 | Simons |
| 7,340,048 B2 | 3/2008 | Stern et al. |
| 7,376,714 B1 | 5/2008 | Gerken |
| 7,636,853 B2 | 12/2009 | Cluts et al. |
| 7,761,591 B2 | 7/2010 | Graham |
| 7,853,472 B2 | 12/2010 | Al-Abdulqader et al. |
| 7,895,177 B2 | 2/2011 | Wu |
| 7,925,708 B2 | 4/2011 | Davis et al. |
| 8,024,399 B2 | 9/2011 | Reisman |
| 8,131,594 B1 | 3/2012 | Yehoshua et al. |
| 8,244,556 B1 | 8/2012 | Ringold |
| 8,256,013 B1 | 8/2012 | Hernacki et al. |
| 8,296,179 B1 | 10/2012 | Rennison |
| 8,332,517 B2 | 12/2012 | Russell |
| 8,365,257 B1 | 1/2013 | Causey et al. |
| 8,375,331 B1 | 2/2013 | Mayers |
| 8,386,353 B2 | 2/2013 | Hirson et al. |
| 8,549,412 B2 | 10/2013 | Brezina et al. |
| 8,595,069 B2 | 11/2013 | Shkedi et al. |
| 8,600,343 B2 | 12/2013 | Brezina et al. |
| 8,650,103 B2 | 2/2014 | Wilf et al. |
| 8,713,027 B2 | 4/2014 | Forutanpour et al. |
| 8,768,838 B1 | 7/2014 | Hoffman |
| 8,863,256 B1 * | 10/2014 | Addepalli ............ H04W 4/046 713/168 |
| 9,262,754 B1 | 2/2016 | Jawharkar |
| 9,264,867 B1 | 2/2016 | Kotab |
| 9,307,380 B1 | 4/2016 | Smith et al. |
| 2001/0027413 A1 | 10/2001 | Bhutta |
| 2001/0049620 A1 | 12/2001 | Blasko |
| 2002/0026382 A1 | 2/2002 | Nakajima |
| 2002/0032785 A1 * | 3/2002 | Britt, Jr. .................... 709/229 |
| 2002/0046084 A1 | 4/2002 | Steele et al. |
| 2002/0049907 A1 | 4/2002 | Woods et al. |
| 2002/0055884 A1 | 5/2002 | Tokuma |
| 2002/0062438 A1 | 5/2002 | Asay et al. |
| 2002/0062451 A1 | 5/2002 | Scheidt et al. |
| 2002/0073041 A1 | 6/2002 | Kumhyr |
| 2002/0085511 A1 | 7/2002 | Koponen et al. |
| 2002/0120714 A1 | 8/2002 | Agapiev |
| 2002/0174363 A1 | 11/2002 | Chefalas et al. |
| 2003/0004898 A1 | 1/2003 | McAuliffe et al. |
| 2003/0009418 A1 | 1/2003 | Green et al. |
| 2003/0061170 A1 | 3/2003 | Uzo |
| 2003/0069874 A1 | 4/2003 | Hertzog et al. |
| 2003/0107606 A1 | 6/2003 | Capps et al. |
| 2003/0126079 A1 | 7/2003 | Roberson et al. |
| 2003/0126092 A1 | 7/2003 | Chihara |
| 2003/0126094 A1 | 7/2003 | Fisher et al. |
| 2003/0130919 A1 | 7/2003 | Templeton et al. |
| 2003/0131260 A1 | 7/2003 | Hanson et al. |
| 2003/0149781 A1 | 8/2003 | Yared et al. |
| 2003/0154171 A1 | 8/2003 | Karp et al. |
| 2003/0177361 A1 | 9/2003 | Wheeler et al. |
| 2003/0177363 A1 | 9/2003 | Yokota et al. |
| 2004/0030637 A1 | 2/2004 | Robison et al. |
| 2004/0070566 A1 | 4/2004 | Ashton |
| 2004/0153405 A1 | 8/2004 | Millary et al. |
| 2004/0199592 A1 | 10/2004 | Gould et al. |
| 2005/0060532 A1 | 3/2005 | Dorenbosch et al. |
| 2005/0091072 A1 | 4/2005 | Dunn et al. |
| 2005/0149854 A1 | 7/2005 | Pennell et al. |
| 2005/0171954 A1 | 8/2005 | Hull et al. |
| 2005/0216953 A1 | 9/2005 | Ellingson |
| 2005/0256766 A1 | 11/2005 | Garcia et al. |
| 2006/0005020 A1 | 1/2006 | Hardt |
| 2006/0020821 A1 | 1/2006 | Waltermann et al. |
| 2006/0029228 A1 | 2/2006 | Lagrange et al. |
| 2006/0036951 A1 | 2/2006 | Marion et al. |
| 2006/0136561 A1 | 6/2006 | Lee |
| 2006/0178986 A1 | 8/2006 | Giordano et al. |
| 2006/0179114 A1 | 8/2006 | Deeds |
| 2006/0195364 A1 | 8/2006 | Shroff et al. |
| 2006/0198351 A1 | 9/2006 | Baek |
| 2006/0206413 A1 | 9/2006 | Van Luchene et al. |
| 2006/0212407 A1 | 9/2006 | Lyon |
| 2006/0212713 A1 | 9/2006 | Hatakeda |
| 2006/0242245 A1 | 10/2006 | Christensen |
| 2006/0251008 A1 | 11/2006 | Wu et al. |
| 2006/0265347 A1 | 11/2006 | Caballero-McCann et al. |
| 2006/0288394 A1 | 12/2006 | Thomas et al. |
| 2007/0042755 A1 | 2/2007 | Singhal |
| 2007/0061301 A1 | 3/2007 | Ramer et al. |
| 2007/0067448 A1 | 3/2007 | Giroux et al. |
| 2007/0087822 A1 | 4/2007 | Van Luchene |
| 2007/0094042 A1 | 4/2007 | Ramer et al. |
| 2007/0121856 A1 | 5/2007 | Alperin et al. |
| 2007/0150603 A1 | 6/2007 | Crull et al. |
| 2007/0192179 A1 | 8/2007 | Van Luchene |
| 2007/0192245 A1 | 8/2007 | Fisher et al. |
| 2007/0198410 A1 | 8/2007 | Labgold et al. |
| 2007/0202484 A1 | 8/2007 | Toombs et al. |
| 2007/0214180 A1 * | 9/2007 | Crawford .................... 707/104.1 |
| 2007/0226303 A1 | 9/2007 | Provo |
| 2007/0250585 A1 * | 10/2007 | Ly et al. ............... 709/206 |
| 2007/0276926 A1 | 11/2007 | LaJoie et al. |
| 2007/0288320 A1 | 12/2007 | Cooper et al. |
| 2008/0005793 A1 | 1/2008 | Wenig et al. |
| 2008/0021829 A1 | 1/2008 | Kranzley |
| 2008/0021958 A1 | 1/2008 | Foote |
| 2008/0071808 A1 | 3/2008 | Hardt et al. |
| 2008/0083826 A1 | 4/2008 | Henry et al. |
| 2008/0097849 A1 | 4/2008 | Ramsaier et al. |
| 2008/0109473 A1 | 5/2008 | Dixon et al. |
| 2008/0114776 A1 | 5/2008 | Sun et al. |
| 2008/0125085 A1 | 5/2008 | Ullah |
| 2008/0127331 A1 | 5/2008 | Seidman et al. |
| 2008/0168099 A1 | 7/2008 | Skaf |
| 2008/0183832 A1 | 7/2008 | Kirkland et al. |
| 2008/0207327 A1 | 8/2008 | Van Luchene et al. |
| 2008/0243873 A1 | 10/2008 | Shah et al. |
| 2008/0275779 A1 | 11/2008 | Lakshminarayanan |
| 2008/0275785 A1 | 11/2008 | Altberg et al. |
| 2008/0301112 A1 | 12/2008 | Wu |
| 2008/0308624 A1 | 12/2008 | Gardner |
| 2009/0006614 A1 | 1/2009 | Le et al. |
| 2009/0006628 A1 | 1/2009 | Webb et al. |
| 2009/0006940 A1 | 1/2009 | Hardt |
| 2009/0031232 A1 | 1/2009 | Brezina et al. |
| 2009/0043502 A1 * | 2/2009 | Shaffer .................. G01C 21/20 701/469 |
| 2009/0061406 A1 | 3/2009 | Clayton et al. |
| 2009/0089176 A1 | 4/2009 | McCabe |
| 2009/0099924 A1 | 4/2009 | Lensch et al. |
| 2009/0100047 A1 | 4/2009 | Jones et al. |
| 2009/0106415 A1 | 4/2009 | Brezina et al. |
| 2009/0119222 A1 | 5/2009 | O'Neil et al. |
| 2009/0141876 A1 | 6/2009 | Carter et al. |
| 2009/0144211 A1 | 6/2009 | O'Sullivan et al. |
| 2009/0149166 A1 | 6/2009 | Habib et al. |
| 2009/0157560 A1 | 6/2009 | Carter et al. |
| 2009/0158030 A1 | 6/2009 | Rasti |
| 2009/0203361 A1 | 8/2009 | Huang et al. |
| 2009/0225967 A1 | 9/2009 | Koch |
| 2009/0227290 A1 | 9/2009 | Chien |
| 2009/0234814 A1 | 9/2009 | Boerries et al. |
| 2009/0240564 A1 | 9/2009 | Boerries et al. |
| 2009/0248680 A1 | 10/2009 | Kalavade |
| 2009/0254824 A1 | 10/2009 | Singh |
| 2009/0259560 A1 | 10/2009 | Bachenheimer |
| 2009/0260064 A1 | 10/2009 | McDowell et al. |
| 2009/0271764 A1 | 10/2009 | Gonzales, II |
| 2009/0282187 A1 | 11/2009 | Ito et al. |
| 2009/0292640 A1 | 11/2009 | Heatherly |
| 2009/0292814 A1 * | 11/2009 | Ting et al. .................... 709/229 |

(56) References Cited

U.S. PATENT DOCUMENTS

| | | |
|---|---|---|
| 2009/0307205 A1 | 12/2009 | Churchill et al. |
| 2009/0319387 A1 | 12/2009 | Keithley et al. |
| 2009/0324022 A1 | 12/2009 | Sangberg et al. |
| 2009/0327296 A1 | 12/2009 | Francis et al. |
| 2009/0328173 A1* | 12/2009 | Jakobson et al. ............ 726/7 |
| 2010/0010887 A1 | 1/2010 | Karlin et al. |
| 2010/0042414 A1 | 2/2010 | Lewis et al. |
| 2010/0042470 A1* | 2/2010 | Chang et al. ............... 705/10 |
| 2010/0054600 A1 | 3/2010 | Anbalagan et al. |
| 2010/0063889 A1 | 3/2010 | Proctor, Jr. et al. |
| 2010/0063914 A1 | 3/2010 | Lozano et al. |
| 2010/0076955 A1 | 3/2010 | Van Steenbergen et al. |
| 2010/0082431 A1 | 4/2010 | Ramer et al. |
| 2010/0088752 A1 | 4/2010 | Nagulakonda et al. |
| 2010/0088753 A1 | 4/2010 | Ayres et al. |
| 2010/0100424 A1 | 4/2010 | Buchanan et al. |
| 2010/0106620 A1* | 4/2010 | Marcus .................... 705/27 |
| 2010/0107152 A1 | 4/2010 | Kwon |
| 2010/0113001 A1 | 5/2010 | Tenbrook et al. |
| 2010/0113162 A1* | 5/2010 | Vemuri ............... G07F 17/3267 463/42 |
| 2010/0131589 A1* | 5/2010 | Lawyer et al. ............. 709/203 |
| 2010/0144442 A1 | 6/2010 | Yanow |
| 2010/0146639 A1 | 6/2010 | Kim et al. |
| 2010/0153148 A1 | 6/2010 | Johnson et al. |
| 2010/0169337 A1 | 7/2010 | Green et al. |
| 2010/0180001 A1 | 7/2010 | Hardt |
| 2010/0187302 A1 | 7/2010 | Sermersheim et al. |
| 2010/0191590 A1 | 7/2010 | Hakkarainen et al. |
| 2010/0211637 A1 | 8/2010 | Borzsei et al. |
| 2010/0228726 A1 | 9/2010 | Slinker et al. |
| 2010/0228767 A1 | 9/2010 | Slinker et al. |
| 2010/0235288 A1 | 9/2010 | Kisbye |
| 2010/0241663 A1 | 9/2010 | Huang et al. |
| 2010/0250578 A1 | 9/2010 | Athsani et al. |
| 2010/0268830 A1* | 10/2010 | McKee et al. ............. 709/228 |
| 2010/0279713 A1* | 11/2010 | Dicke ..................... 455/457 |
| 2010/0296505 A1 | 11/2010 | Kissinger et al. |
| 2010/0312636 A1 | 12/2010 | Coulter et al. |
| 2010/0313009 A1* | 12/2010 | Combet et al. ............. 713/150 |
| 2010/0318614 A1 | 12/2010 | Sager et al. |
| 2010/0322396 A1 | 12/2010 | Southerland |
| 2010/0324989 A1* | 12/2010 | Etchegoyen ............... 705/14.45 |
| 2011/0010423 A1 | 1/2011 | Thatcher et al. |
| 2011/0022621 A1 | 1/2011 | Luo et al. |
| 2011/0029616 A1 | 2/2011 | Wang et al. |
| 2011/0040609 A1 | 2/2011 | Hawkins et al. |
| 2011/0053574 A1 | 3/2011 | Rice |
| 2011/0060905 A1 | 3/2011 | Stack et al. |
| 2011/0071899 A1 | 3/2011 | Robertson et al. |
| 2011/0072109 A1 | 3/2011 | Robb et al. |
| 2011/0082737 A1 | 4/2011 | Crowe et al. |
| 2011/0093949 A1* | 4/2011 | Macrae ............ G06F 17/30864 726/19 |
| 2011/0099612 A1* | 4/2011 | Lee et al. ................... 726/6 |
| 2011/0106429 A1* | 5/2011 | Poppen et al. ............. 701/201 |
| 2011/0106610 A1 | 5/2011 | Landis et al. |
| 2011/0106674 A1 | 5/2011 | Perlman |
| 2011/0110364 A1 | 5/2011 | Fried et al. |
| 2011/0131491 A1 | 6/2011 | Lu et al. |
| 2011/0137932 A1* | 6/2011 | Wable ............... G06F 17/30867 707/769 |
| 2011/0142299 A1* | 6/2011 | Akbarzadeh et al. ....... 382/118 |
| 2011/0145273 A1* | 6/2011 | Kolathaya et al. ........ 707/769 |
| 2011/0159856 A1 | 6/2011 | Walsh et al. |
| 2011/0165896 A1 | 7/2011 | Stromberg et al. |
| 2011/0179126 A1 | 7/2011 | Wetherell et al. |
| 2011/0183651 A1* | 7/2011 | Mundy et al. .... G06F 17/30265 455/414.1 |
| 2011/0191177 A1 | 8/2011 | Blackhurst et al. |
| 2011/0191433 A1 | 8/2011 | Du |
| 2011/0209194 A1 | 8/2011 | Kennedy |
| 2011/0213785 A1* | 9/2011 | Kristiansson et al. ...... 707/748 |
| 2011/0215949 A1* | 9/2011 | Yarnold ................. G08G 1/123 340/989 |
| 2011/0225048 A1 | 9/2011 | Nair |
| 2011/0225640 A1 | 9/2011 | Ganapathy et al. |
| 2011/0231241 A1 | 9/2011 | Kesari et al. |
| 2011/0231282 A1 | 9/2011 | Dai |
| 2011/0258049 A1 | 10/2011 | Ramer et al. |
| 2011/0264648 A1 | 10/2011 | Gulik et al. |
| 2011/0269424 A1 | 11/2011 | Multer et al. |
| 2011/0288868 A1 | 11/2011 | Lloyd et al. |
| 2011/0288923 A1 | 11/2011 | Steinert et al. |
| 2011/0289132 A1 | 11/2011 | Polis et al. |
| 2011/0289143 A1 | 11/2011 | Polis et al. |
| 2011/0289153 A1 | 11/2011 | Hull et al. |
| 2011/0298701 A1 | 12/2011 | Holzer et al. |
| 2011/0320282 A1 | 12/2011 | Ramer et al. |
| 2011/0320314 A1 | 12/2011 | Brown |
| 2012/0005221 A1 | 1/2012 | Ickman et al. |
| 2012/0017266 A1 | 1/2012 | DiChiara et al. |
| 2012/0022927 A1* | 1/2012 | Yankovich et al. ......... 705/14.5 |
| 2012/0022931 A1 | 1/2012 | Syed et al. |
| 2012/0027189 A1* | 2/2012 | Shaffer ............ H04M 3/42068 379/142.1 |
| 2012/0030724 A1 | 2/2012 | Godas et al. |
| 2012/0036015 A1 | 2/2012 | Sheikh |
| 2012/0036364 A1 | 2/2012 | Yoneda et al. |
| 2012/0041830 A1* | 2/2012 | Rothschild et al. ........ 705/26.1 |
| 2012/0042320 A1* | 2/2012 | Jamjoom et al. ........... 718/104 |
| 2012/0044089 A1* | 2/2012 | Yarnold ................. G08G 1/202 340/901 |
| 2012/0066142 A1 | 3/2012 | Jenkins et al. |
| 2012/0066301 A1* | 3/2012 | Holland .................. H04L 67/12 709/204 |
| 2012/0069731 A1 | 3/2012 | Tooher et al. |
| 2012/0071131 A1 | 3/2012 | Zisapel et al. |
| 2012/0072494 A1 | 3/2012 | Wong et al. |
| 2012/0077462 A1 | 3/2012 | Rozensztejn et al. |
| 2012/0079019 A1 | 3/2012 | Miettinen et al. |
| 2012/0084078 A1 | 4/2012 | Moganti et al. |
| 2012/0094642 A1* | 4/2012 | Popperl et al. .............. 455/415 |
| 2012/0116979 A1 | 5/2012 | Hatch et al. |
| 2012/0130898 A1* | 5/2012 | Snyder ................. G06Q 20/32 705/44 |
| 2012/0131350 A1 | 5/2012 | Atherton |
| 2012/0143859 A1 | 6/2012 | Lymperopoulos et al. |
| 2012/0143968 A1* | 6/2012 | Oren ................. H04L 29/12716 709/206 |
| 2012/0148043 A1* | 6/2012 | Tofighbakhsh ............. 380/247 |
| 2012/0150742 A1 | 6/2012 | Poon et al. |
| 2012/0159479 A1 | 6/2012 | Chardon et al. |
| 2012/0166530 A1* | 6/2012 | Tseng ............... G06Q 30/0255 709/204 |
| 2012/0167234 A1 | 6/2012 | Donfried et al. |
| 2012/0182935 A1* | 7/2012 | Addepalli ............... H04W 4/02 370/328 |
| 2012/0192258 A1 | 7/2012 | Spencer et al. |
| 2012/0196581 A1 | 8/2012 | Papakipos et al. |
| 2012/0196629 A1* | 8/2012 | Movsesyan et al. ......... 455/466 |
| 2012/0203846 A1 | 8/2012 | Hull et al. |
| 2012/0203853 A1 | 8/2012 | Davis et al. |
| 2012/0214442 A1* | 8/2012 | Crawford ............... H04W 12/06 455/411 |
| 2012/0244875 A1 | 9/2012 | Cardona et al. |
| 2012/0246075 A1 | 9/2012 | Rasti |
| 2012/0246079 A1 | 9/2012 | Sikes ........................ 705/325 |
| 2012/0251077 A1 | 10/2012 | Stewart et al. |
| 2012/0253985 A1 | 10/2012 | Maron et al. |
| 2012/0254774 A1 | 10/2012 | Patton |
| 2012/0257753 A1* | 10/2012 | Ochikubo et al. ........... 380/270 |
| 2012/0278732 A1 | 11/2012 | Lee et al. |
| 2012/0290468 A1 | 11/2012 | Benco et al. |
| 2012/0303616 A1 | 11/2012 | Abuelsaad et al. |
| 2012/0324228 A1* | 12/2012 | Padhye et al. ......... H04L 9/0869 713/176 |
| 2013/0006749 A1 | 1/2013 | Fink et al. |
| 2013/0013727 A1 | 1/2013 | Walker |
| 2013/0019089 A1 | 1/2013 | Guidotti et al. |
| 2013/0024267 A1 | 1/2013 | Libenson et al. |

(56) References Cited

U.S. PATENT DOCUMENTS

| | | |
|---|---|---|
| 2013/0030922 A1 | 1/2013 | Shalabi et al. |
| 2013/0031009 A1 | 1/2013 | Kapoor et al. |
| 2013/0040654 A1* | 2/2013 | Parish ............... H04W 12/06 455/456.1 |
| 2013/0041961 A1 | 2/2013 | Thrower, III et al. |
| 2013/0047100 A1 | 2/2013 | Kroeger et al. |
| 2013/0051542 A1 | 2/2013 | Yao et al. |
| 2013/0060850 A1 | 3/2013 | Davis et al. |
| 2013/0061050 A1 | 3/2013 | Davis et al. |
| 2013/0061127 A1* | 3/2013 | Reyes et al. ............ 715/234 |
| 2013/0110827 A1 | 5/2013 | Nabar et al. |
| 2013/0185285 A1 | 7/2013 | Shuman et al. |
| 2013/0227707 A1 | 8/2013 | Gay et al. |
| 2013/0332700 A1 | 12/2013 | Kopylovitz et al. |
| 2014/0048454 A1* | 2/2014 | Birken ............... B03D 1/01 209/166 |
| 2014/0058568 A1 | 2/2014 | Imes et al. |
| 2014/0067702 A1 | 3/2014 | Rathod |
| 2014/0068270 A1 | 3/2014 | Shenoy |
| 2014/0087687 A1 | 3/2014 | Brezina et al. |
| 2014/0128001 A1 | 5/2014 | Imes et al. |
| 2014/0222690 A1 | 8/2014 | Wilf et al. |
| 2015/0293997 A1 | 10/2015 | Smith et al. |

OTHER PUBLICATIONS

Milian, Mark; "Facebook lets users opt out of facial recognition"; CNN Tech; Jun. 9, 2011; pp. 1-5; retrieved by examiner on May 30, 2013; CNN Cable News Network, Turner Broadcasting System, Inc.; located at: http://www.cnn.com/2011/TECH/social.media/06/07/facebook.facial.recognition/index.html.

"How to Set Up an ICE Contact on Your iPhone"; The Backup Plan; Jun. 21, 2010; 11 pages; located at mn10.wordpress.com/2010/06/21/how-to-set-up-an-ice-contact-on-your-iphone/.

Spivack, Nova; "How Siri Works—Interview with Tom Gruber, CTO of SIRI"; Jan. 26, 2010; 9 pages; located at http://www.novaspivack.com/technology/how-hisiri-works-interview-with-tom-gruber-cto . . . .

* cited by examiner

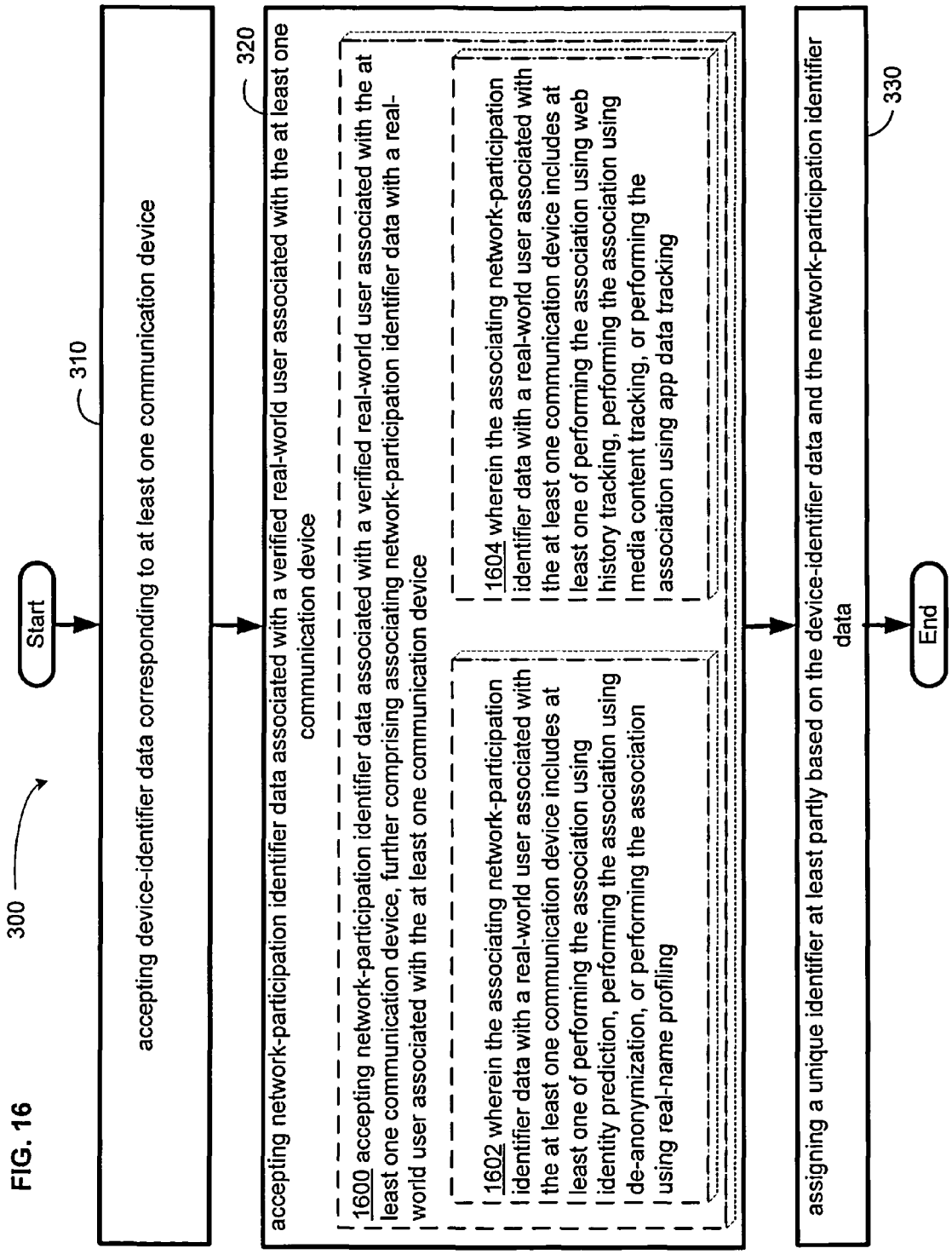

COMPUTATIONAL SYSTEMS AND METHODS FOR LINKING USERS OF DEVICES

TECHNICAL FIELD

This description relates to data capture and data handling techniques.

SUMMARY

An embodiment provides a system. In one implementation, the system includes but is not limited to circuitry for accepting device-identifier data corresponding to at least one communication device; circuitry for accepting network-participation identifier data associated with a verified real-world user associated with the at least one communication device; and circuitry for assigning a unique identifier at least partly based on the device-identifier data and the network-participation identifier data. In addition to the foregoing, other system aspects are described in the claims, drawings, and text forming a part of the present disclosure.

In one or more various aspects, related systems include but are not limited to circuitry and/or programming for effecting the herein-referenced method aspects; the circuitry and/or programming can be virtually any combination of hardware, software, and/or firmware configured to effect the herein-referenced method aspects depending upon the design choices of the system designer.

In one or more various aspects, related systems include but are not limited to computing means and/or programming for effecting the herein-referenced method aspects; the computing means and/or programming may be virtually any combination of hardware, software, and/or firmware configured to effect the herein-referenced method aspects depending upon the design choices of the system designer.

An embodiment provides a computer-implemented method. In one implementation, the method includes but is not limited to accepting device-identifier data corresponding to at least one communication device; accepting network-participation identifier data associated with a verified real-world user associated with the at least one communication device; and assigning a unique identifier at least partly based on the device-identifier data and the network-participation identifier data. In addition to the foregoing, other method aspects are described in the claims, drawings, and text forming a part of the present disclosure.

An embodiment provides an article of manufacture including a computer program product. In one implementation, the article of manufacture includes but is not limited to a signal-bearing medium configured by one or more instructions related to (a) accepting device-identifier data corresponding to at least one communication device; (b) accepting network-participation identifier data associated with a verified real-world user associated with the at least one communication device; and (c) assigning a unique identifier at least partly based on the device-identifier data and the network-participation identifier data. In addition to the foregoing, other computer program product aspects are described in the claims, drawings, and text forming a part of the present disclosure.

An embodiment provides a system. In one implementation, the system includes but is not limited to a computing device and instructions. The instructions when executed on the computing device cause the computing device to (a) accept device-identifier data corresponding to at least one communication device; (b) accept network-participation identifier data associated with a verified real-world user associated with the at least one communication device; and (c) assign a unique identifier at least partly based on the device-identifier data and the network-participation identifier data. In addition to the foregoing, other system aspects are described in the claims, drawings, and text forming a part of the present disclosure.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent in the teachings set forth herein.

BRIEF DESCRIPTION OF THE FIGURES

With reference now to FIG. 1, shown is an example of a system for linking users of devices in which embodiments may be implemented, perhaps in a device and/or through a network, which may serve as a context for introducing one or more processes and/or devices described herein.

Figure 3:
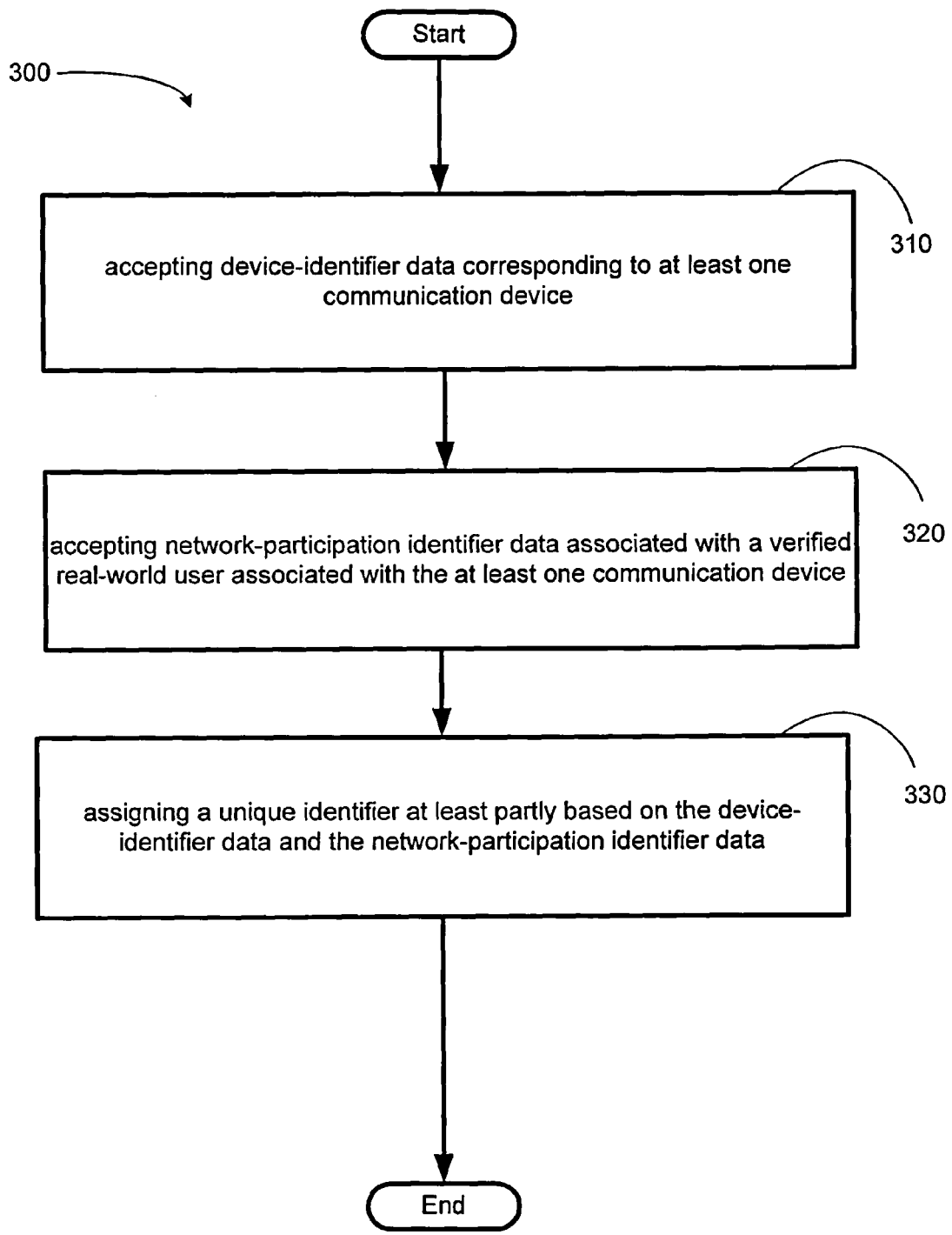

With reference now to FIG. 3, shown is an example of an operational flow representing example operations related to linking users of devices, which may serve as a context for introducing one or more processes and/or devices described herein.

Figure 4:
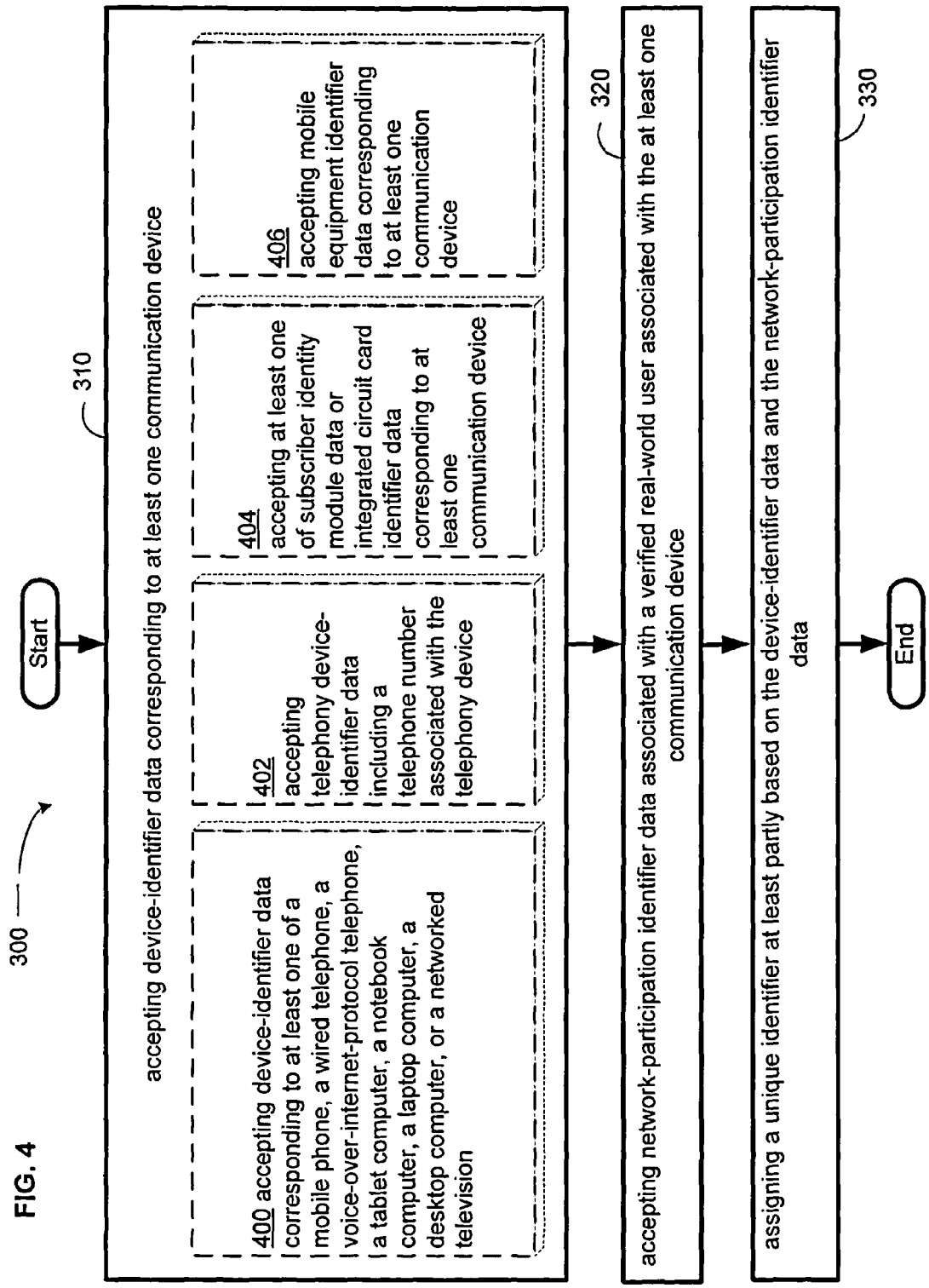

FIG. 4 illustrates an alternative embodiment of the example operational flow of FIG. 3.

Figure 5:
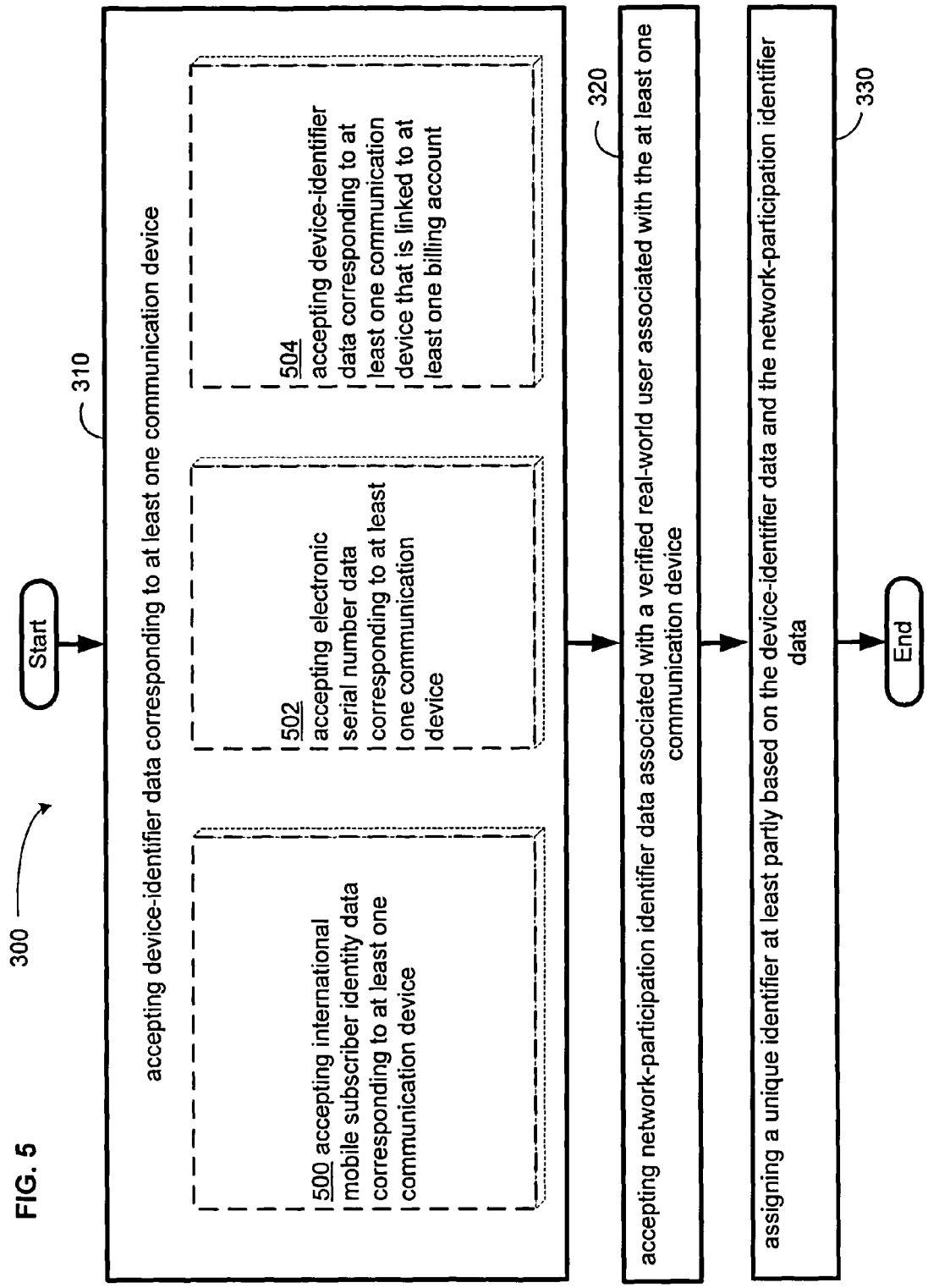

FIG. 5 illustrates an alternative embodiment of the example operational flow of FIG. 3.

Figure 6:
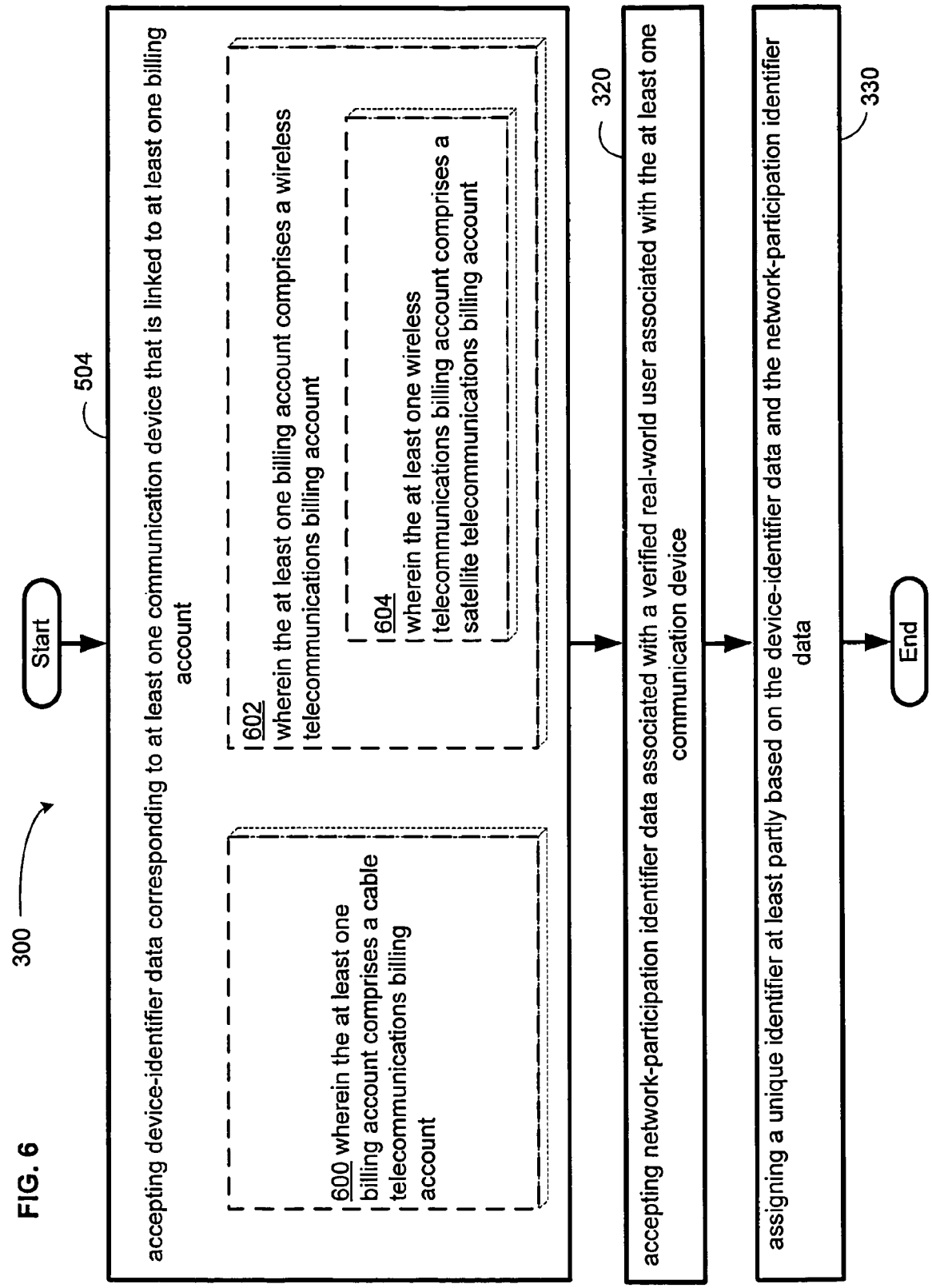

FIG. 6 illustrates an alternative embodiment of the example operational flow of FIG. 3.

Figure 7:
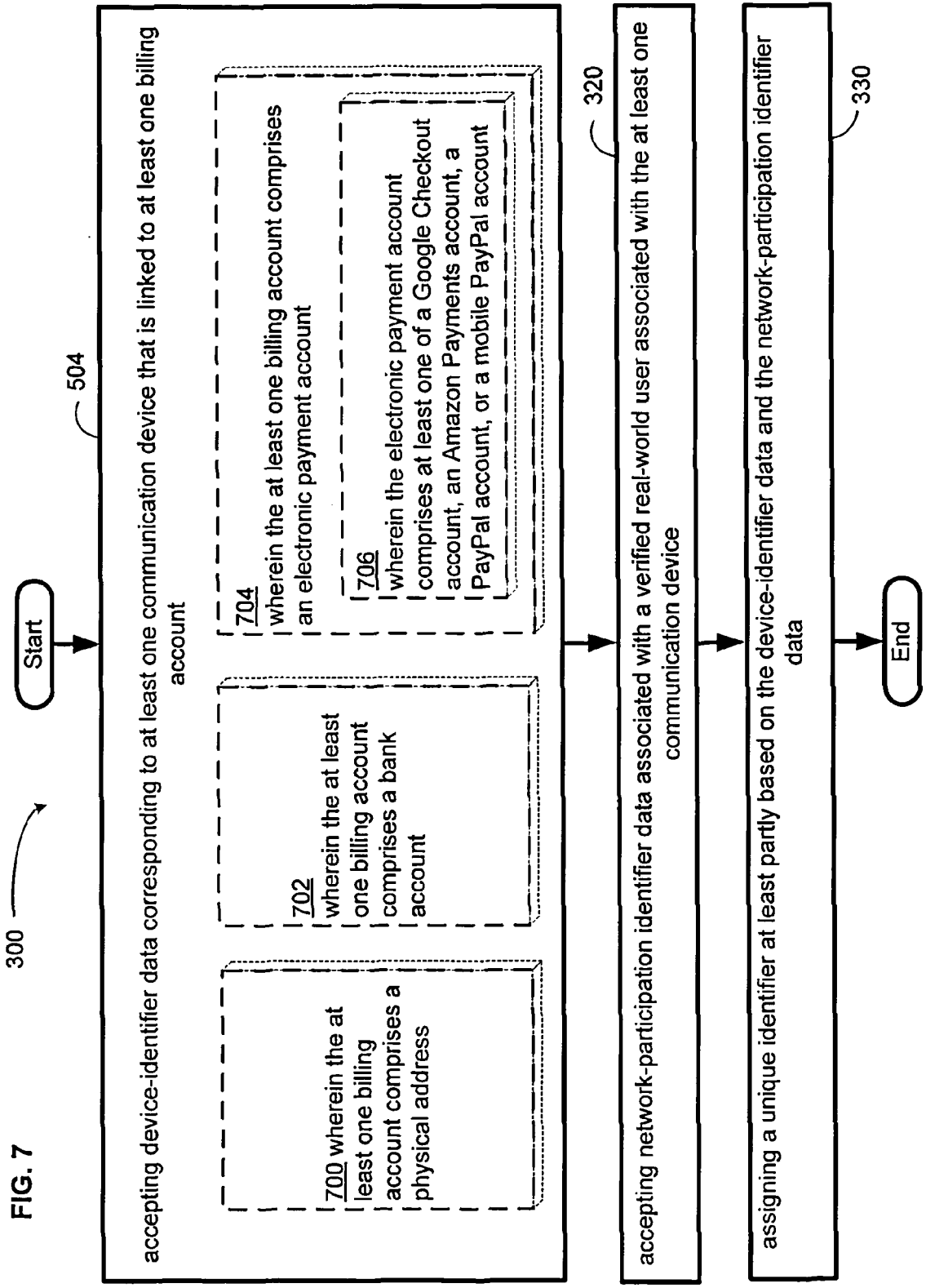

FIG. 7 illustrates an alternative embodiment of the example operational flow of FIG. 3.

Figure 8:
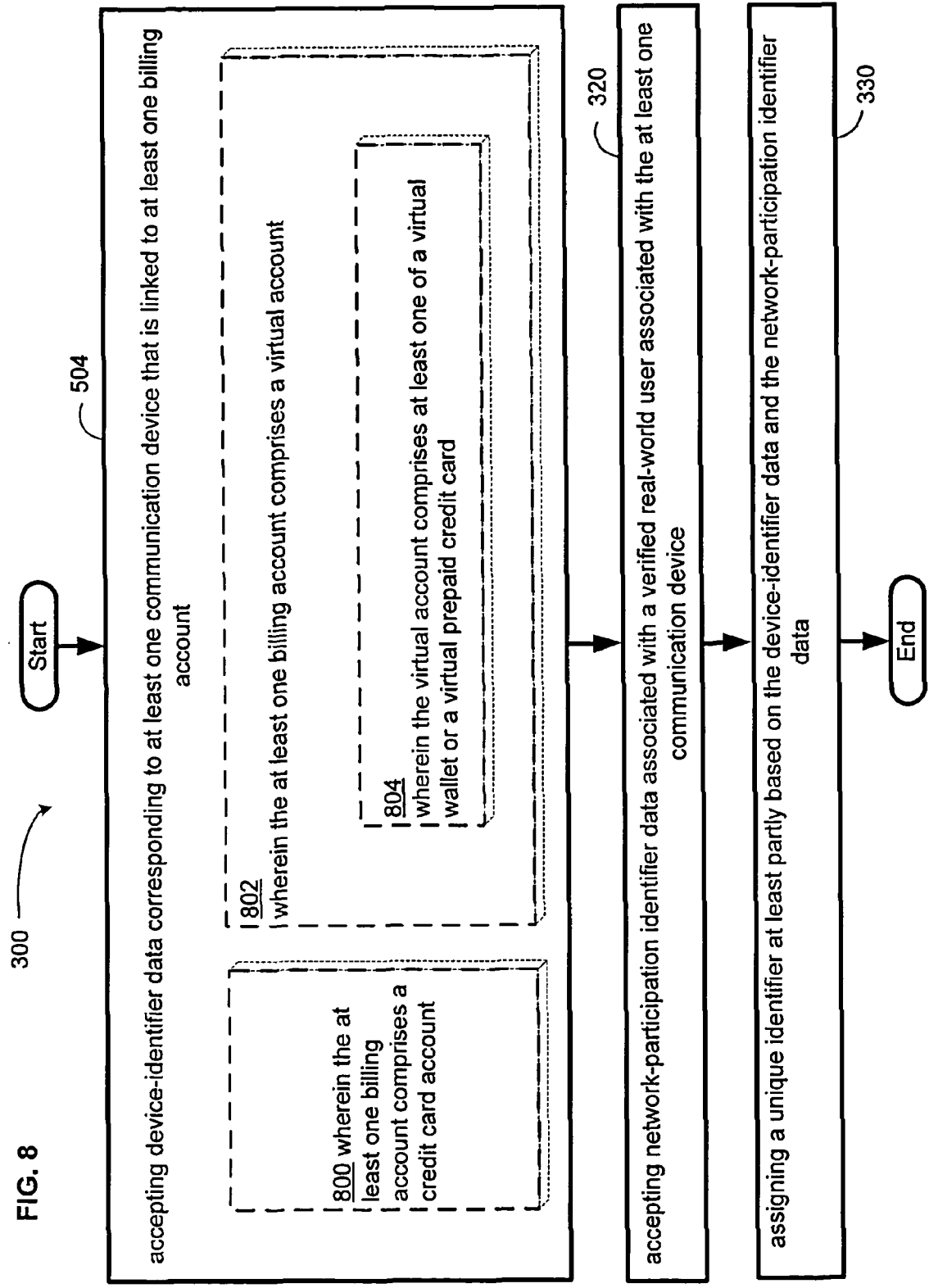

FIG. 8 illustrates an alternative embodiment of the example operational flow of FIG. 3.

Figure 9:
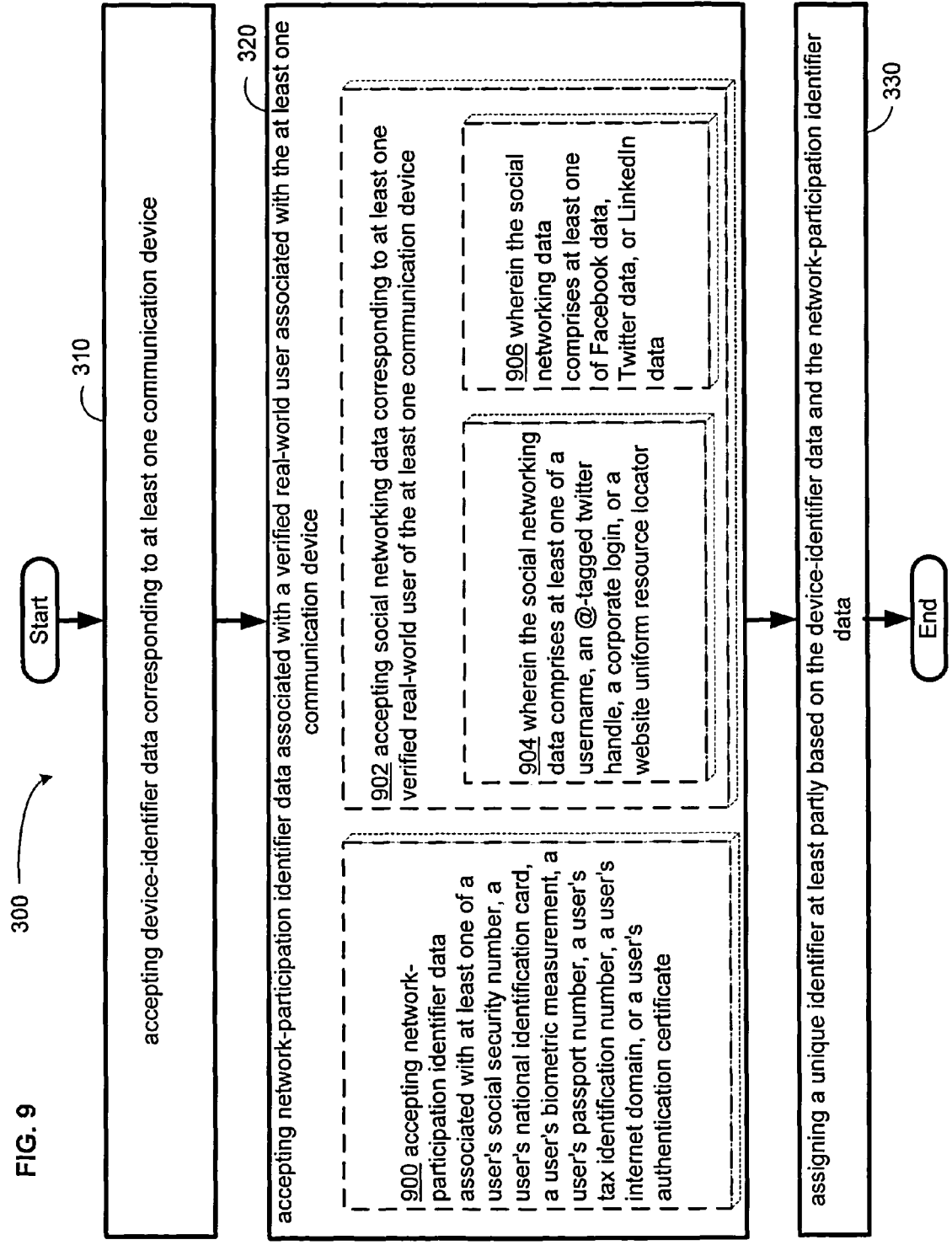

FIG. 9 illustrates an alternative embodiment of the example operational flow of FIG. 3.

Figure 10:
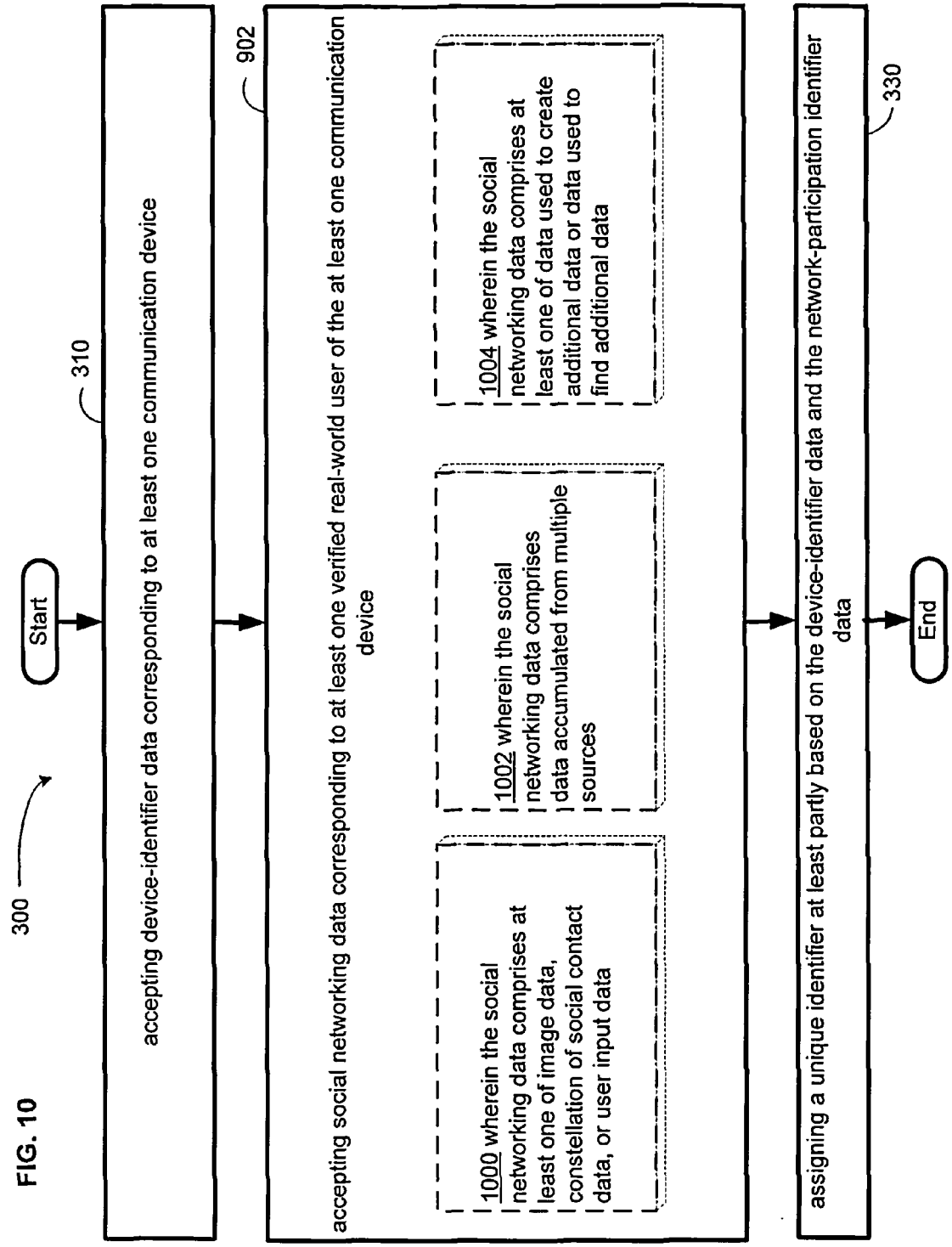

FIG. 10 illustrates an alternative embodiment of the example operational flow of FIG. 3.

Figure 11:
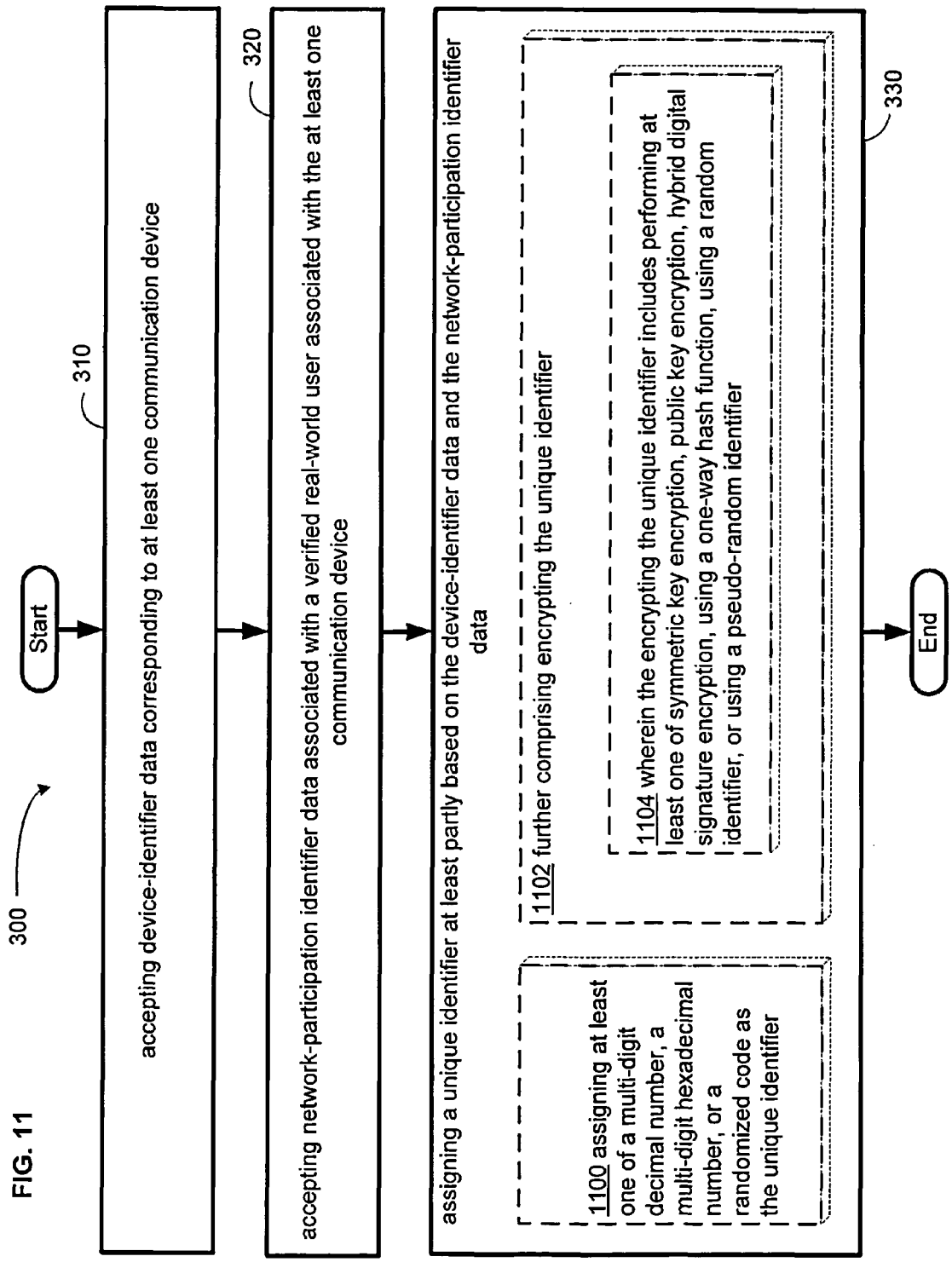

FIG. 11 illustrates an alternative embodiment of the example operational flow of FIG. 3.

Figure 12:
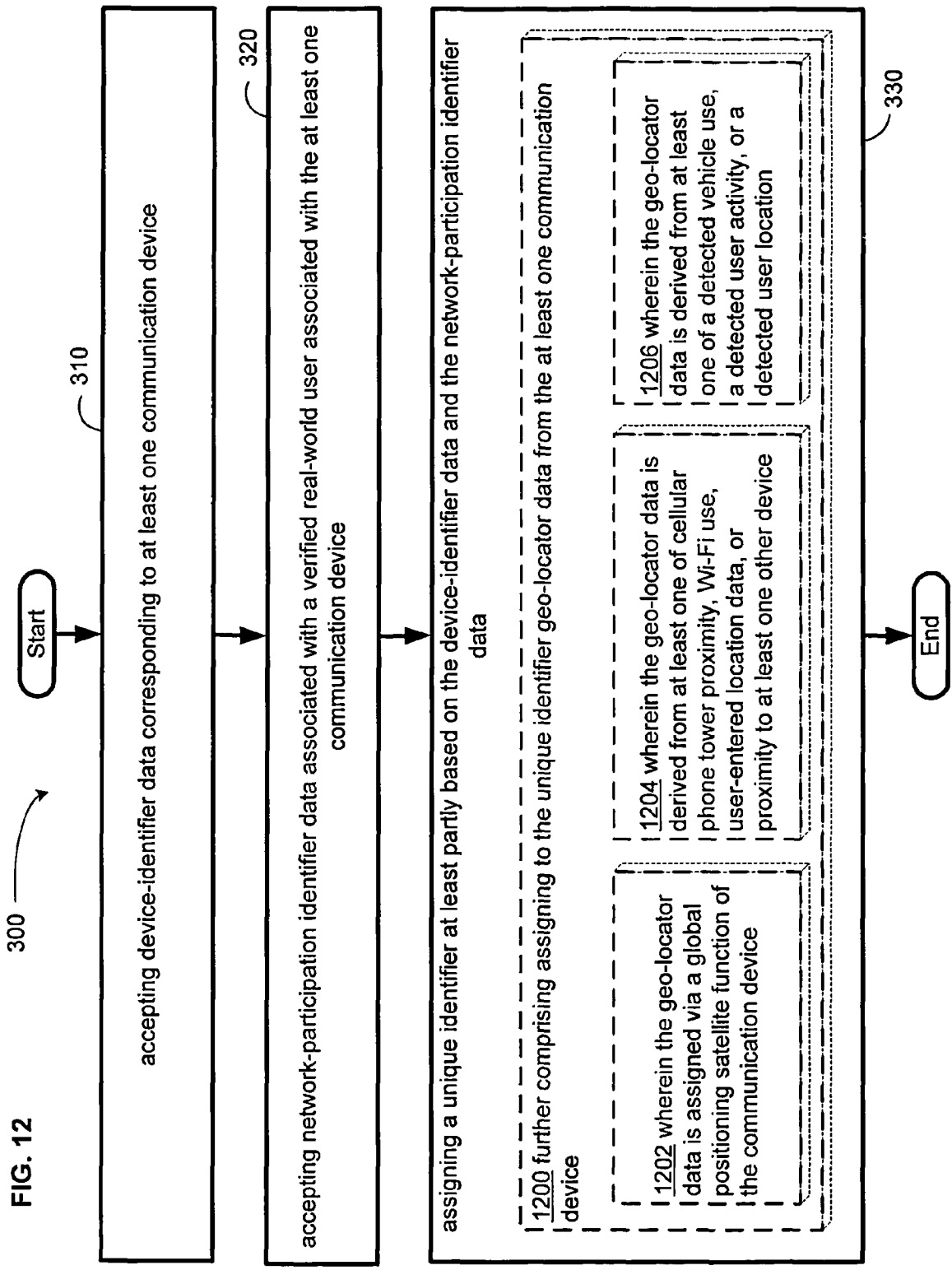

FIG. 12 illustrates an alternative embodiment of the example operational flow of FIG. 3.

Figure 13:
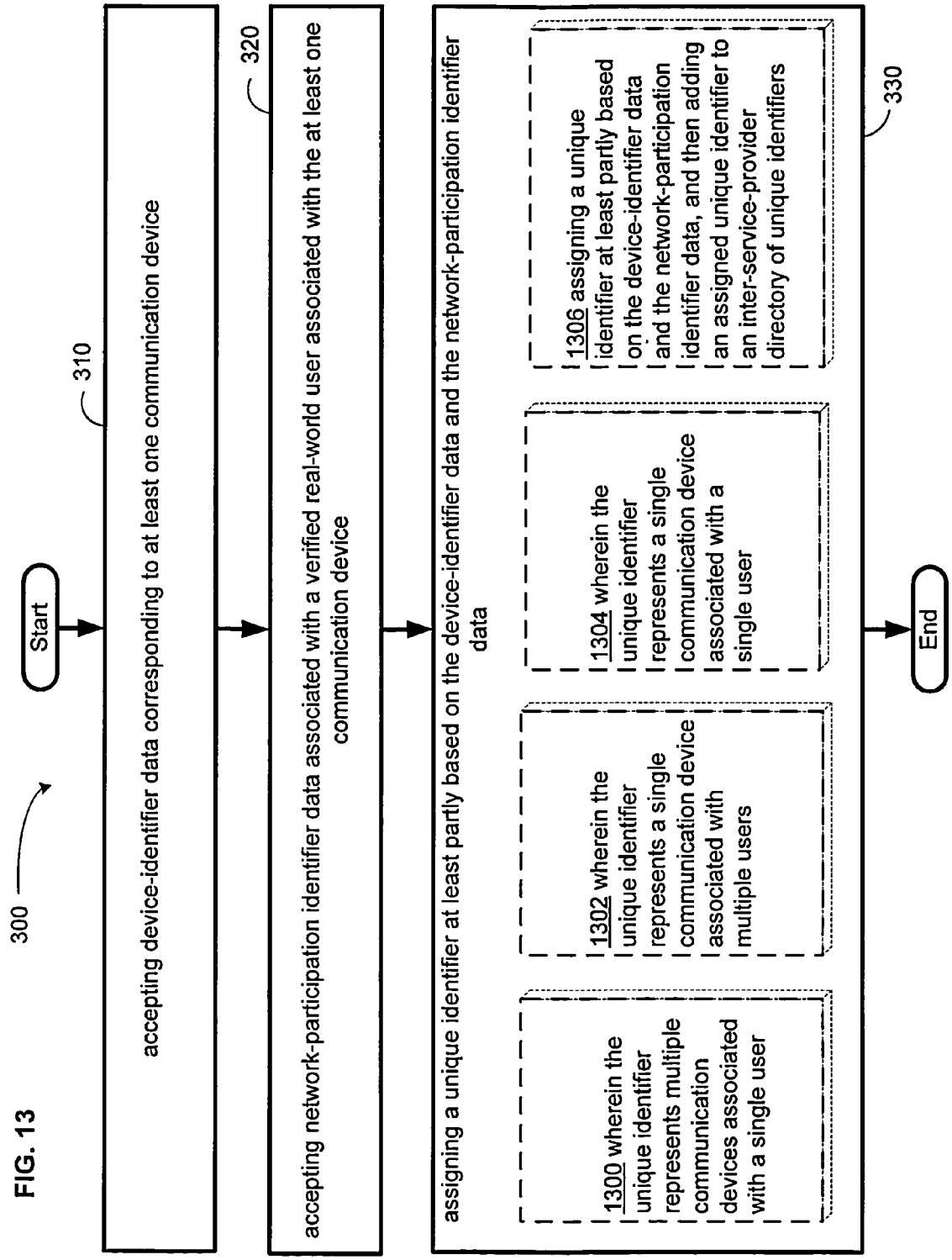

FIG. 13 illustrates an alternative embodiment of the example operational flow of FIG. 3.

Figure 14:
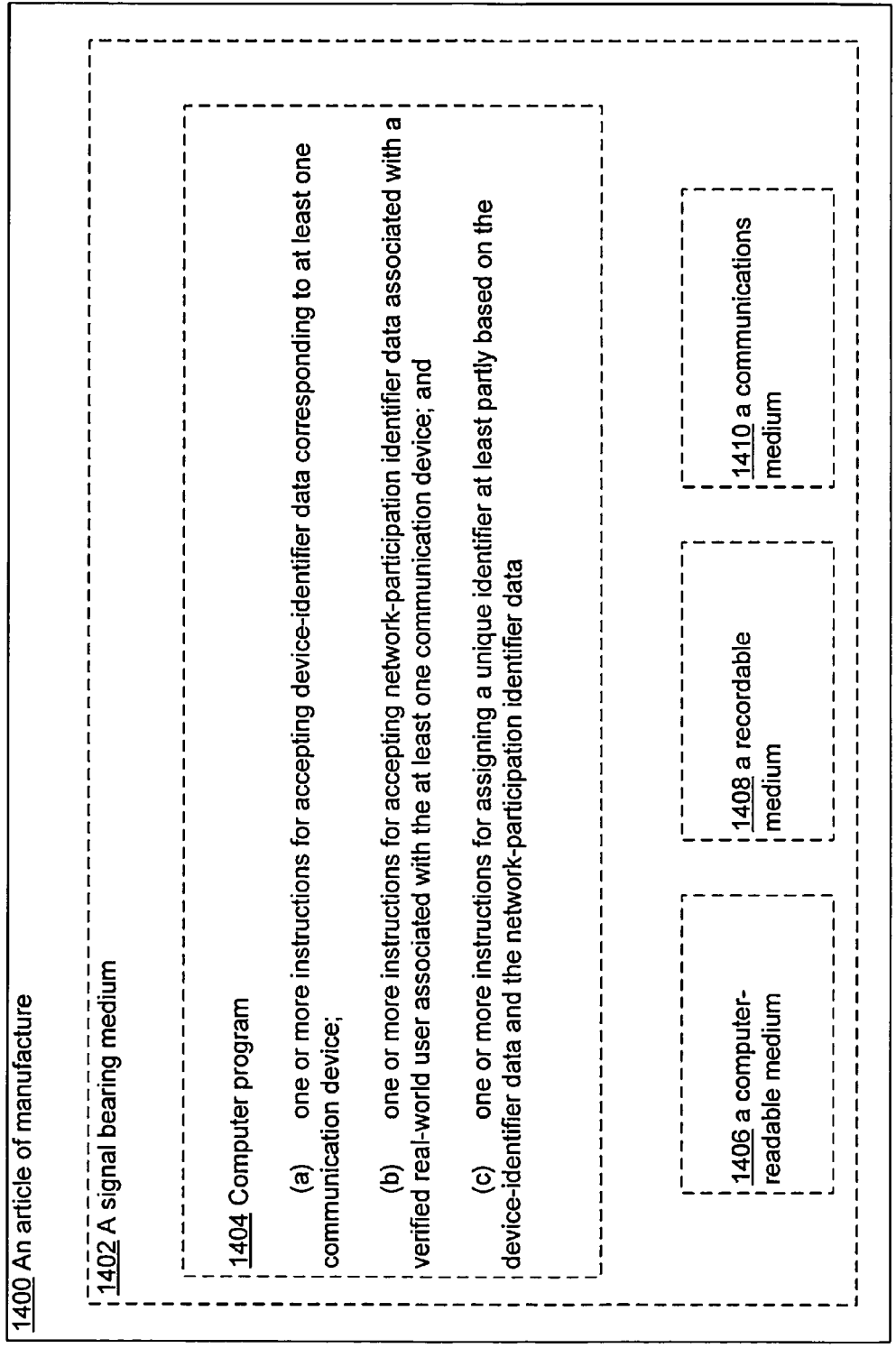

With reference now to FIG. 14, shown is a partial view of an example article of manufacture including a computer program product that includes a computer program for executing a computer process on a computing device related to linking users of devices, which may serve as a context for introducing one or more processes and/or devices described herein.

Figure 15:
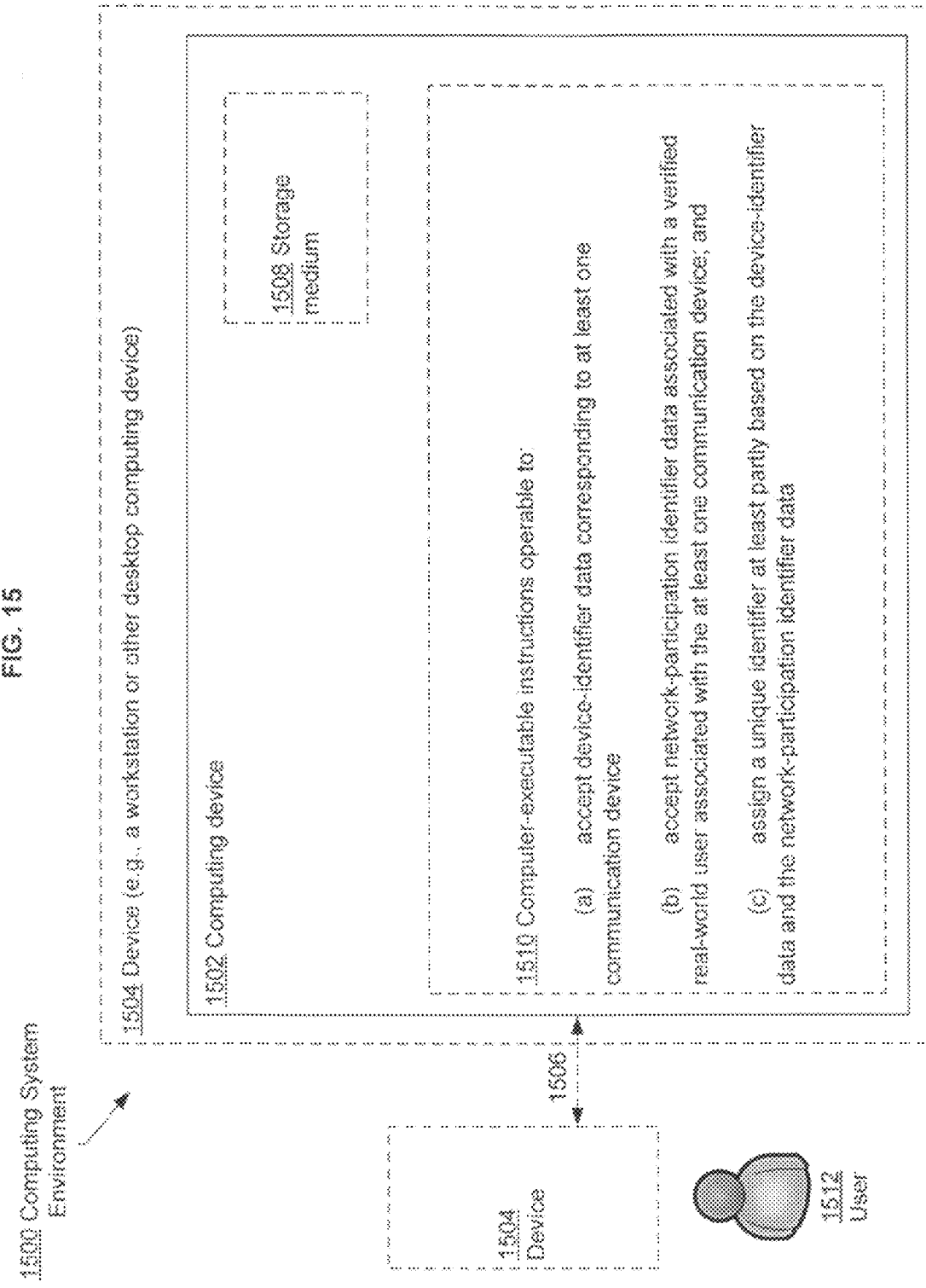

With reference now to FIG. 15, shown is an example device in which embodiments may be implemented related to linking users of devices, which may serve as a context for introducing one or more processes and/or devices described herein.

FIG. 16 illustrates an alternative embodiment of the example operational flow of FIG. 3.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Figure 1:
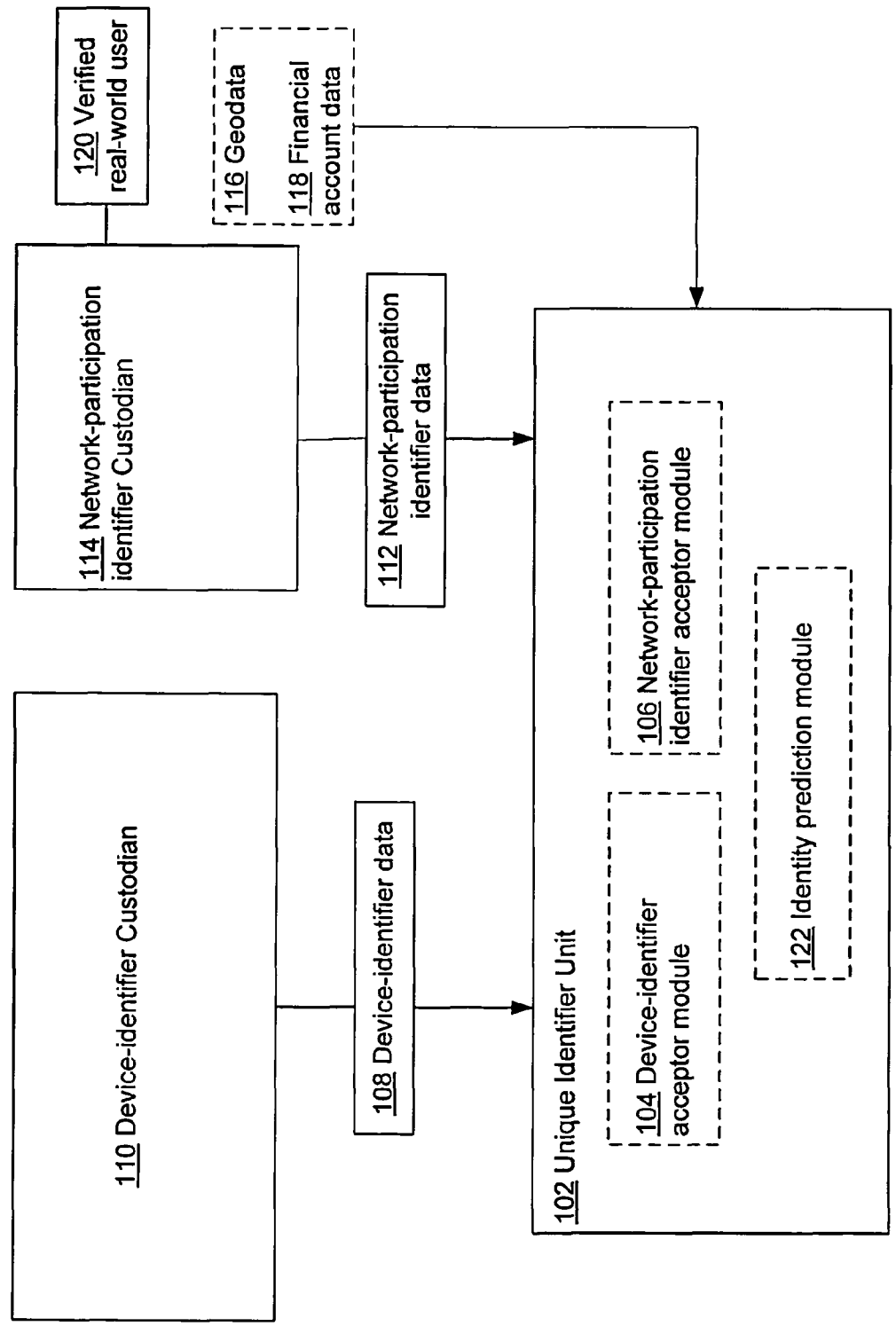

FIG. 1 illustrates an example system 100 in which embodiments may be implemented. The system 100 includes a unique identifier unit 102. The unique identifier unit 102 may contain, for example, device-identifier acceptor module 104 and network-participation identifier acceptor module 106. Unique identifier unit 102 may communicate over a network or directly with device-identifier custodian 110 to accept device-identifier data 108. Unique identifier unit 102 may also communicate over a network or directly with network-participation identifier custodian 114 to accept network-participation identifier data 112 associated with a verified real-world user 120 associated with the at least one communication device. Optionally, unique identifier unit 102 may also accept geodata 116 or financial account data 118. Unique identifier unit 102 may also include identity prediction module 122 for associating network-participation identifier data with a verified real-world user 120 associated with a communication device.

In FIG. 1, unique identifier unit 102 may assign a unique identifier based on accepted device-identifier data 108 and accepted network-participation identifier data 112. Optionally, unique identifier unit 102 may assign geodata 116 and/or financial account data 118 to an assigned unique identifier.

In FIG. 1, the unique identifier unit 102 is illustrated as possibly being included within a system 100. Of course, virtually any kind of computing device may be used to implement the special purpose unique identifier unit 102, such as, for example, a workstation, a desktop computer, a networked computer, a server, a collection of servers and/or databases, a virtual machine running inside a computing device, a mobile computing device, or a tablet PC.

Additionally, not all of the unique identifier unit 102 need be implemented on a single computing device. For example, the unique identifier unit 102 may be implemented and/or operable on a remote computer, while a user interface and/or local instance of the unique identifier unit 102 are implemented and/or occur on a local computer. Further, aspects of the unique identifier unit 102 may be implemented in different combinations and implementations than that shown in FIG. 1. For example, functionality of a user interface may be incorporated into the unique identifier unit 102. The unique identifier unit 102 may perform simple data relay functions and/or complex data analysis, including, for example, fuzzy logic and/or traditional logic steps. Further, many methods of assigning unique identifiers described herein or known in the art may be used, including, for example, algorithms used in generating globally unique identifiers, universally unique identifiers, and/or other random number generation methods. In some embodiments, the unique identifier unit 102 may assign unique identifiers based on device-identifier data 108 and/or network-participation identifier data 112 available as updates through a network.

Unique identifier unit 102 may access data stored in virtually any type of memory that is able to store and/or provide access to information in, for example, a one-to-many, many-to-one, and/or many-to-many relationship. Such a memory may include, for example, a relational database and/or an object-oriented database, examples of which are provided in more detail herein.

Figure 2:
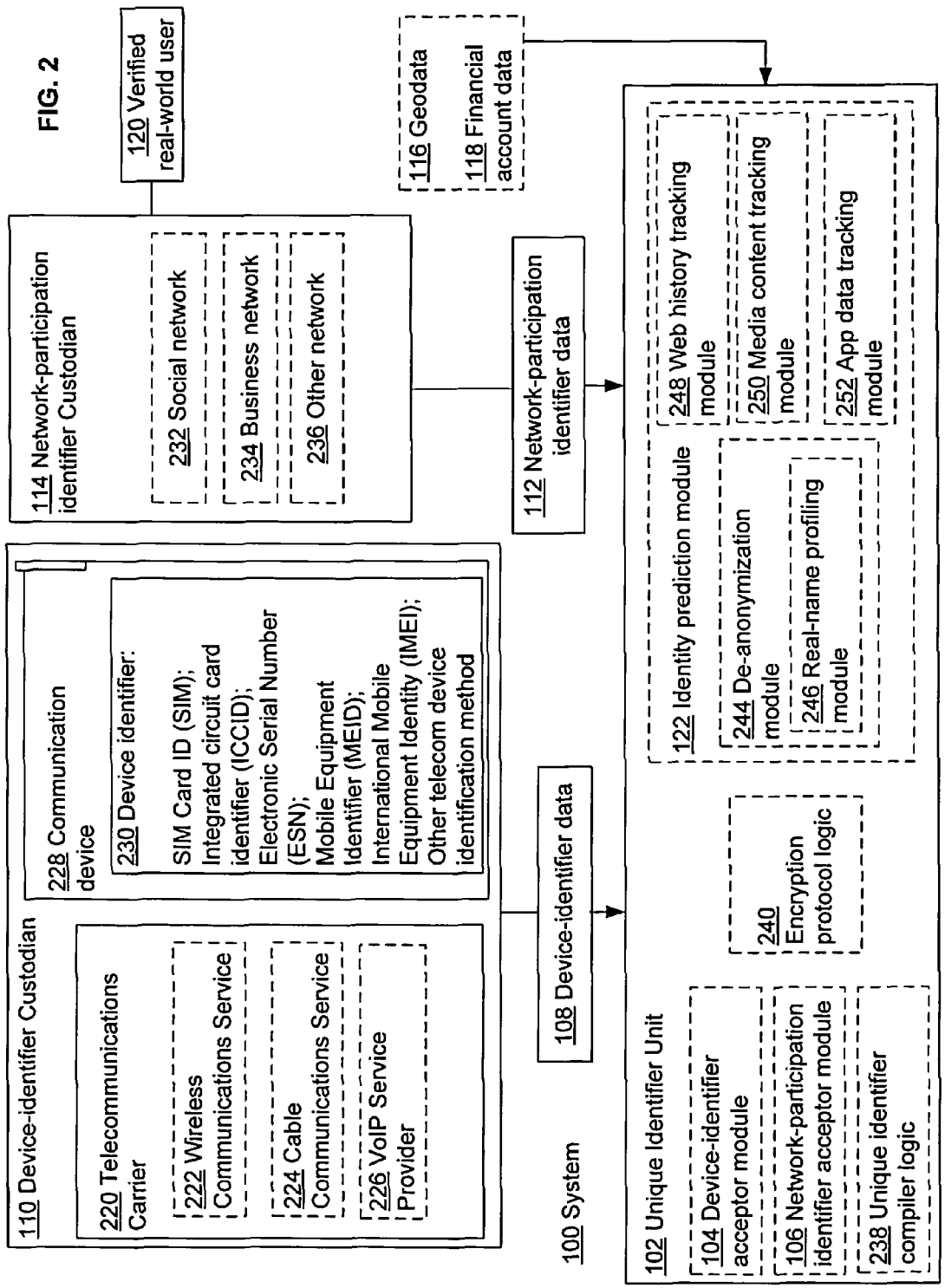
FIG. 2 illustrates certain alternative embodiments of the system for linking users of devices of FIG. 1.

FIG. 2 illustrates certain alternative embodiments of the system 100 of FIG. 1. In FIG. 2, The unique identifier unit 102 may also include unique identifier compiler logic 238 and or encryption protocol logic 240. Unique identifier unit 102 may communicate over a network or directly with device-identifier custodian 110 to accept device-identifier data 108, perhaps in the form of device identifier 230 from communication device 228. Unique identifier unit 102 may also communicate over a network or directly with network-participation identifier custodian 114 to accept network-participation identifier data 112 associated with a verified real-world user 120 associated with the at least one communication device, perhaps from social network 232, business network 234, and/or other network 236.

In this way, the unique identifier unit 102 may generate a compiled and/or encrypted list of unique identifiers that are optionally coded with or otherwise linked to geodata and/or financial account data.

In some embodiments, unique identifier compiler logic 112 may create a compiled set of composite identifiers that can be used to disambiguate search results in the network based on device-identifier data, network participation identifier data, and/or geodata, for example. Unique identifier unit 102 can be operated by a telecom company or by a social or other network owner, or by both in cooperation with each other. A compiled list of unique identifiers as discussed herein can represent all or substantially all unique user devices in a given social network or other communications network, e.g., wireless network, email network, or the like.

A directory of uniquely-identified devices can serve as the foundation for searching within a social network, and for facilitating financial transactions via the device for members of the social network associated with the device.

In some embodiments, unique identifier unit 102 may also include identity prediction module 122 for associating network-participation identifier data with a verified real-world user 120 associated with a communication device 228. Identity prediction module 122 may include various search and/or matching functions for associating network-participation identifier data 112 with a verified real-world user 120 associated with a communications device 228. For example, identity prediction module 122 may include de-anonymization module 244, which in turn may include real-name profiling module 246. Identity prediction module 122 may also include web history tracking module 248, media content tracking module 250, and/or app list tracking module 252.

For the purposes of this application, SIM as used herein includes mini-SIM, micro-SIM, Universal Subscriber Identity Module, CDMA Subscriber Identity Module, Universal Integrated Circuit Card, Removable User Identity Module, virtual SIM, and other variants of the subscriber identity module described herein and understood by those of ordinary skill in the art.

As referenced herein, the unique identifier unit 102 may be used to perform various data querying and/or recall techniques with respect to the device-identifier data 108 and/or network-participation identifier data 112, in order to assign a unique identifier. For example, where the network-participation identifier data 112 is organized, keyed to, and/or otherwise accessible using one or more user accounts such as social network, email, or the like, unique identifier unit 102 may employ various Boolean, statistical, and/or semi-boolean searching techniques to assign a unique identifier. Similarly, for example, where device-identifier data 108 is organized, keyed to, and/or otherwise accessible using one or more device-identifier custodian 110, various Boolean, statistical, and/or semi-boolean searching techniques may be performed by unique identifier unit 102 to assign a unique identifier.

Many examples of databases and database structures may be used in connection with the unique identifier unit 102. Such examples include hierarchical models (in which data is organized in a tree and/or parent-child node structure), network models (based on set theory, and in which multi-parent structures per child node are supported), or object/relational models (combining the relational model with the object-oriented model).

Still other examples include various types of eXtensible Mark-up Language (XML) databases. For example, a database may be included that holds data in some format other than XML, but that is associated with an XML interface for accessing the database using XML. As another example, a database may store XML data directly. Additionally, or alternatively, virtually any semi-structured database may be used, so that context may be provided to/associated with stored data elements (either encoded with the data elements, or encoded externally to the data elements), so that data storage and/or access may be facilitated.

Such databases, and/or other memory storage techniques, may be written and/or implemented using various programming or coding languages. For example, object-oriented database management systems may be written in programming languages such as, for example, C++ or Java. Relational and/or object/relational models may make use of database languages, such as, for example, the structured query language (SQL), which may be used, for example, for interactive queries for disambiguating information and/or for gathering and/or compiling data from the relational database(s).

For example, SQL or SQL-like operations over one or more device-identifier data 108 and/or network-participation identifier data 112 may be performed, or Boolean operations using a device-identifier data 108 and/or network-participation identifier data 112 may be performed. For example, weighted Boolean operations may be performed in which different weights or priorities are assigned to one or more of the device-identifier data 108 and/or network-participation identifier data 112, including various network participation aliases associated with a particular verified real-world user, perhaps relative to one another. For example, a number-weighted, exclusive-OR operation may be performed to request specific weightings of network participation identifiers.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

FIG. 3 illustrates an operational flow 300 representing example operations related to linking users of devices. In FIG. 3 and in following figures that include various examples of operational flows, discussion and explanation may be provided with respect to the above-described system environments of FIGS. 1-2, and/or with respect to other examples and contexts. However, it should be understood that the operational flows may be executed in a number of other environments and contexts including that of FIG. 15, and/or in modified versions of FIGS. 1-2. Also, although the various operational flows are presented in the sequence(s) illustrated, it should be understood that the various operations may be performed in other orders than those which are illustrated, or may be performed concurrently.

After a start operation, operation 310 depicts accepting device-identifier data corresponding to at least one communication device. For example, unique identifier unit 102 and/or device-identifier acceptor module 104 can accept device-identifier data 108 from a telecommunications carrier 220, for example in the form of a Unique Device Identifier (UDID) for an iPhone or iPod Touch. The UDID is a sequence of 40 letters and numbers that is specific to each iPhone or iPod Touch. It may look something like this: 2b6f0cc904d137be2e1730235f5664094b831186. Other examples of sources of device-identifier data 108 include voice-over-internet-protocol service providers such as Skype (peer-to-peer VoIP), and wireless carriers such as Verizon Wireless (CDMA-based wireless communication). Other examples of device-identifier data 108 include Media Access Control addresses (MAC address) and International Mobile Equipment Identity numbers (IMEI).

Operation 320 depicts accepting network-participation identifier data associated with a verified real-world user associated with the at least one communication device. For example, unique identifier unit 102 and/or network-participation identifier acceptor module 106 may accept from Facebook a username associated with a verified real-world user having an iPhone and corresponding account with a telecommunications company. In another example, unique identifier unit 102 may accept from LinkedIn the name of a person associated with a videoconferencing device and corresponding account with a videoconferencing service such as WebEx Web conferencing. In another example, unique identifier unit 102 may accept from Google the email address of a person associated with an Android phone and corresponding account with a wireless carrier.

In some embodiments, network-participation identifier custodian 114 and device-identifier custodian 110 will cooperate to provide the necessary network-participation identifier data 112 and device-identifier data 108 to unique identifier unit 102. For example, Facebook may provide usernames, images, birthdates, telephone numbers, or other data that it has about the verified real-world users of its social network to a consortium of telecommunications carriers 220 (this may optionally involve an opting-in step whereby users of Facebook affirmatively approve this action), who may provide device-identifier data 108. Assigning a unique identifier (discussed below) for each network-user-associated device across each of the carriers in the consortium may result in a directory that is particularly valuable for the telecommunications carriers, who can then provide directory searching, support, and disambiguation for a potentially large fraction of the Facebook social network. Such a directory will likely be of equal interest and value to networks including Facebook in this example, for the same reasons. For example, a cross-carrier directory of Facebook members with associated phone numbers would be an added feature for Facebook that could significantly enhance the social information provided by the network.

Operation 330 depicts assigning a unique identifier at least partly based on the device-identifier data and the network-participation identifier data. For example, unique identifier unit 102, upon accepting device-identifier data 108 and network-participation identifier data 112 associated with a verified real-world user 120 associated with the at least one communication device, may assign a randomly-generated 32-bit unique identifier. In the iPhone example above, unique identifier unit 102 may accept the iPhone's unique device identifier (UDID) as the device-identifier data 108, accept an iTunes username associated with a user with a valid credit card and security code as the network-participation identifier data 112 associated with a verified real-world user 120 associated with the at least one communication device, and assign a unique identifier to the device and username pair.

As another example, unique identifier unit 102 may accept the MAC address of a networked computer as the device-identifier data 108, accept an Outlook email address associated with a user with a verified biometric measurement as the network-participation identifier data 112 associated with a verified real-world user 120 associated with the at least one communication device, and assign a unique identifier to the computer and email address pair.

As another example, unique identifier unit 102 may accept a mobile phone's integrated circuit card ID (ICC-ID) as the device-identifier data 108, accept a Facebook username associated with a user with a valid Facebook Credits account as the network-participation identifier data 112 associated with a verified real-world user 120 associated with the at least one communication device, and assign a unique identifier to the mobile phone and Facebook username pair.

In some embodiments, unique identifier unit 102 may include an identity prediction algorithm such as a de-anonymization algorithm, a real-name profiling algorithm, a web history tracking algorithm, media content tracking algorithm, and/or an app list tracking algorithm. These algorithms may aid in the association of network-participation identifier data with a verified real-world user 120 associated with the communication device 228, where those associations are not provided directly by a device-identifier custodian 110 and/or a network-participation identifier custodian 114.

FIG. 4 illustrates alternative embodiments of the example operational flow 300 of FIG. 3. FIG. 4 illustrates example embodiments where the accepting operation 310 may include at least one additional operation. Additional operations may include operation 400, 402, 404, and/or operation 406.

Operation 400 depicts accepting device-identifier data corresponding to at least one of a mobile phone, a wired telephone, a voice-over-internet-protocol telephone, a tablet computer, a notebook computer, a laptop computer, a desktop computer, or a networked television. For example, unique identifier unit 102 and/or device-identifier acceptor module 104 may accept device-identifier data corresponding to at least one of a mobile phone, a wired telephone, a voice-over-internet-protocol telephone, a tablet computer, a notebook computer, a laptop computer, a desktop computer, or a networked television. For example, device-identifier acceptor module 104 may accept a mobile phone's mobile equipment identifier, a land line's telephone number, or a networked computer's media access control address (MAC address) or internet protocol address (IP address).

Device-identifier data 108 may be accepted in different forms depending on the device identified. For example, an IP address or MAC address may be used to identify a computer.

Every device connected to the public internet is assigned a unique number known as an internet protocol address (IP address). IP addresses consist of four numbers separated by periods (also called a "dotted-quad") and look something like 127.0.0.1. Since these numbers are usually assigned to internet service providers within region-based blocks, an IP address can often be used to identify the region or country from which a computer is connecting to the Internet. An IP address can sometimes be used to show the user's general location. An IP address may also be assigned to a Host name, which may be easier to remember. Hostnames may be looked up to find IP addresses, and vice-versa. At one time internet service providers issued one IP address to each user. These are static IP addresses. With the increased number of issued IP addresses, internet service providers now issue IP addresses in a dynamic fashion out of a pool of IP addresses using dynamic host configuration protocol (DHCP), which provides a central database for keeping track of computers that have been connected to the network. This prevents two computers from accidentally being configured with the same IP address. These are referred to as dynamic IP addresses. In addition to users connecting to the internet, with virtual hosting, a single machine can act like multiple machines, with multiple domain names and IP addresses.

MAC addresses are unique identifiers assigned to network interfaces for communications on the physical network segment. They are most often assigned by the manufacturer of a network interface card (NIC) and are stored in its hardware, the card's read-only memory, or some other firmware mechanism. If assigned by the manufacturer, a MAC address usually encodes the manufacturer's registered identification number and may be referred to as the burned-in address. It may also be known as an Ethernet hardware address (EHA), hardware address, or physical address. A network node may have multiple NICs and will then have one unique MAC address per NIC.

A subscriber identity module or subscriber identification module (SIM) is an integrated circuit that securely stores the service-subscriber key or international mobile subscriber identity (IMSI) used to identify a subscriber on mobile telephony devices (such as mobile phones and computers). A SIM card typically contains its unique serial number (integrated circuit card identifier or ICCID), an internationally unique number of the mobile user (IMSI), security authentication and ciphering information, temporary information related to the local network, a list of the services the user has access to and two passwords: a personal identification number (PIN) for usual use and a PIN unlock code (PUC) for unlocking. A SIM card may also store other carrier-specific data such as the SMSC (Short Message Service Center) number, Service Provider Name (SPN), Service Dialing Numbers (SDN), Advice-Of-Charge parameters and Value Added Service (VAS) applications.

A SIM card's ICCID is stored in the SIM card and also engraved or printed on the SIM card body. The ICCID is typically composed of an issuer identification number (IIN), an individual account identification number, and a check digit.

SIM cards are identified on their individual operator networks by a unique international mobile subscriber identity number or IMSI. Mobile operators connect mobile phone calls and communicate with their market SIM cards using their IMSIs. The format is: the first 3 digits represent the Mobile Country Code (MCC), the next 2 or 3 digits represent the Mobile Network Code (MNC), and the next digits represent the mobile station identification number.

SIM cards may also orthogonally store a number of SMS messages and phone book contacts. A SIM is held on a removable SIM card, which can be transferred between different mobile devices.

Operation 402 depicts accepting telephony device-identifier data including a telephone number associated with the telephony device. For example, unique identifier unit 102 may accept a ten-digit telephone number or a seven-digit telephone number from a telecommunications carrier 220 as the device-identifier data 108. The number contains the information necessary to identify uniquely the intended endpoint for the telephone call. Each such endpoint must have a unique number within the public switched telephone network.

Operation 404 depicts accepting at least one of subscriber identity module data or integrated circuit card identifier data corresponding to at least one communication device. For example, unique identifier unit 102 may accept an international mobile subscriber identity (IMSI) from a mobile phone's SIM card from a telecommunications carrier 220 as the device-identifier data 108. As another example, device-identifier acceptor module 104 may accept from a wireless communications service 222 an integrated circuit card identifier number from a SIM card for a mobile phone.

Operation 406 depicts accepting mobile equipment identifier data corresponding to at least one communication device. For example, unique identifier unit 102 may accept a mobile equipment identifier corresponding to a mobile handset from a telecommunications carrier 220 or wireless communications service 222. A Mobile Equipment IDentifier (MEID) is a globally unique 56-bit identification number for a physical piece of mobile equipment. Equipment identifiers are "burned" into a device and are used as a means to facilitate mobile equipment identification and tracking. Additionally, MEIDs are coordinated with International Mobile Equipment Identifiers (IMEIs), facilitating global roaming and harmonization between 3G technologies as a universal mobile equipment identifier. The MEID is a 14-digit hexadecimal value. The MEID is capable of being transmitted over the air upon a request from the network. The MEID is composed mainly of two basic components, the manufacturer code and the serial number.

FIG. 5 illustrates alternative embodiments of the example operational flow 300 of FIG. 3. FIG. 5 illustrates example embodiments where the accepting operation 310 may include at least one additional operation. Additional operations may include operation 500, 502, and/or operation 504.

Operation 500 depicts accepting international mobile subscriber identity data corresponding to at least one communication device. For example, device-identifier acceptor module 104 may accept an international mobile subscriber identity (IMSI) from a mobile phone's SIM card from a wireless communications service 222 as the device-identifier data 108. An International Mobile Subscriber Identity or IMSI is a unique identification associated with all GSM and UMTS network mobile phone users. It is stored as a 64-bit field in the SIM inside the phone and is sent by the phone to the network. It is also used for acquiring other details of the mobile device in the Home Location Register (HLR) or as locally copied in the Visitor Location Register. To prevent eavesdroppers identifying and tracking the subscriber on the radio interface, the IMSI is sent as rarely as possible and a randomly-generated temporary mobile subscriber identity (TMSI) is sent instead. The IMSI is used in any mobile network that interconnects with other networks. This number is kept in the phone directly or in the removable user identity module (R-UIM) card, a card developed for CDMA handsets that extends the GSM SIM card to CDMA phones and networks.

Operation 502 depicts accepting electronic serial number data corresponding to at least one communication device. For example, unique identifier unit 102 may accept an electronic serial number from a mobile phone's SIM card from a telecommunications carrier 220 as the device-identifier data 108. As another example, device-identifier acceptor module 104 may accept from a wireless communications service 222 an electronic serial number from a SIM card for a CDMA-based mobile phone.

Operation 504 depicts accepting device-identifier data corresponding to at least one communication device that is linked to at least one billing account. For example, unique identifier unit 102 may accept a mobile equipment identifier from a mobile phone's SIM card from a telecommunications carrier 220, the MEID corresponding to a billing account for a subscriber of a wireless service provided by the telecommunications carrier 220. As another example, device-identifier acceptor module 104 may accept from a wireless communications service 222 an IMSI from a SIM card for a mobile phone, the IMSI corresponding to a billing account for a subscriber of the wireless communications service 222.

FIG. 6 illustrates alternative embodiments of the example operational flow 300 of FIGS. 3 and 5. FIG. 6 illustrates example embodiments where the accepting operation 504 may include at least one additional operation. Additional operations may include operation 600, 602, and/or operation 604.

Operation 600 depicts accepting device-identifier data corresponding to at least one communication device that is linked to at least one billing account, wherein the at least one billing account comprises a cable telecommunications billing account. For example, unique identifier unit 102 may accept a computer user's MAC address or IP address as the device identifier data 108. In this example, the MAC address or IP address of the computer may be linked to a Skype account for billing purposes.

Operation 602 depicts accepting device-identifier data corresponding to at least one communication device that is linked to at least one billing account, wherein the at least one billing account comprises a wireless telecommunications billing account. For example, unique identifier unit 102 may accept from a wireless service provider an IMEI for a mobile phone linked to a billing account for an individual subscriber.

Operation 604 depicts accepting device-identifier data corresponding to at least one communication device that is linked to at least one billing account, wherein the at least one wireless telecommunications billing account comprises a satellite telecommunications billing account. For example, unique identifier unit 102 may accept from a satellite-based wireless service provider such as LightSquared, a device-identifier for a mobile phone linked to a billing account for an individual subscriber.

FIG. 7 illustrates alternative embodiments of the example operational flow 300 of FIGS. 3 and 5. FIG. 7 illustrates example embodiments where the accepting operation 504 may include at least one additional operation. Additional operations may include operation 700, 702, 704, and/or operation 706.

Operation 700 depicts accepting device-identifier data corresponding to at least one communication device that is linked to at least one billing account, wherein the at least one billing account comprises a physical address. For example, device-identifier acceptor module 104 may accept from a wireless communications service 222 an IMSI from a SIM card for a mobile phone, the IMSI corresponding to a billing account for a subscriber of the wireless communications service 222 at a specific street, city, and country address.

Operation 702 depicts accepting device-identifier data corresponding to at least one communication device that is linked to at least one billing account, wherein the at least one billing account comprises a bank account. For example, device-identifier acceptor module 104 may accept from a wireless communications service 222 an iPhone or iPod Touch device identifier, the identifier corresponding to a bank account number for a subscriber of the wireless service to the iPhone or iPod Touch device.

Operation 704 depicts accepting device-identifier data corresponding to at least one communication device that is linked to at least one billing account, wherein the at least one billing account comprises an electronic payment account. To continue the previous example involving the iPhone or iPod Touch device, the wireless service subscription may be linked to a bank's electronic payment service, wire transfer service, or the like.

Operation 706 depicts accepting device-identifier data corresponding to at least one communication device that is linked to at least one electronic payment account, wherein the electronic payment account comprises at least one of a Google Checkout account, an Amazon Payments account, a PayPal account, or a mobile PayPal account. For example, a unique identifier unit 102 may accept a mobile device ID for an Android mobile phone from an Android app such as "Android Device ID" available for download from the Android Market. The Android mobile device ID, perhaps derived from a wireless network socket, for the mobile phone may correspond to a Google Checkout account for the subscriber of the wireless service to the mobile phone.

FIG. 8 illustrates alternative embodiments of the example operational flow 300 of FIGS. 3 and 5. FIG. 8 illustrates example embodiments where the accepting operation 504 may include at least one additional operation. Additional operations may include operation 800, 802, and/or operation 804.

Operation 800 depicts accepting device-identifier data corresponding to at least one communication device that is linked to at least one billing account, wherein the at least one billing account comprises a credit card account. For example, a wireless device's service subscription may be linked to a user's credit card account.

Operation 802 depicts accepting device-identifier data corresponding to at least one communication device that is linked to at least one billing account, wherein the at least one billing account comprises a virtual account. For example, to continue the Google Checkout example above, a unique identifier unit 102 may accept a mobile device ID for an Android mobile phone from an Android app such as "Android Device ID" available for download from the Android Market. The Android mobile device ID for the mobile phone may correspond to a virtual account such as a Facebook credit account.

Operation 804 depicts accepting device-identifier data corresponding to at least one communication device that is linked to at least one virtual account, wherein the virtual account comprises at least one of a virtual wallet or a virtual prepaid credit card. For example, to continue the Google Checkout example above, a unique identifier unit 102 may accept a mobile device ID for an Android mobile phone from an Android app such as "Android Device ID" available for download from the Android Market. The Android mobile device ID for the mobile phone may correspond to a virtual wallet account such as Google wallet.

FIG. 9 illustrates alternative embodiments of the example operational flow 300 of FIG. 3. FIG. 9 illustrates example embodiments where the accepting operation 320 may include at least one additional operation. Additional operations may include operation 900, 902, 904, and/or operation 906.

Operation 900 depicts accepting network-participation identifier data associated with at least one of a user's social security number, a user's national identification card, a user's biometric measurement, a user's passport number, a user's tax identification number, a user's internet domain, or a user's authentication certificate. For example, unique identifier unit 102 and/or network-participation identifier acceptor module 106 may accept network-participation identifier data associated with at least one of a user's social security number, a user's national identification card, a user's biometric measurement, a user's passport number, a user's tax identification number, a user's internet domain, or a user's authentication certificate. For example, network-participation identifier acceptor module 106 may accept a Facebook username as network-participation identifier data, the username associated with a photograph of the user as a biometric measurement verifying that a real-world user is associated with the username. In some embodiments, an image recognition system may be employed to associate an image with a specific user. In some embodiments, the real-world user may be a corporation.

In another example, network-participation identifier acceptor module 106 may accept an email address as network-participation identifier data, the email address associated with a social security number on file with a telecommunications company with which the user has a service subscription.

As used herein, "network-participation identifier data" may refer to a signifier of belonging in a network, such as an email address; a username, such as a social networking user name; or other mark such as an image, number, or writing that signifies participation in a particular network.

Operation 902 depicts accepting social networking data corresponding to at least one verified real-world user of the at least one communication device. For example, unique identifier unit 102 and/or network-participation identifier acceptor module 106 may accept a Google+ username as a network-participation identifier datum, wherein the Google+ username is associated with a photograph of the user having the username. In some embodiments, the photograph of the user may be analyzed by image recognition technologies to identify a person having specific geographic, demographic, or other identifying characteristics.

Operation 904 depicts accepting social networking data corresponding to at least one verified real-world user of the at least one communication device, wherein the social networking data comprises at least one of a username, an @-tagged twitter handle, a corporate login, or a website uniform resource locator (URL). For example, unique identifier unit 102 and/or network-participation identifier acceptor module 106 may accept a blogger's website URL as a network-participation identifier datum, wherein the website URL is associated with a photograph and/or description of the blogger on the website at the website URL.

Operation 906 depicts accepting social networking data corresponding to at least one verified real-world user of the at least one communication device, wherein the social networking data comprises at least one of Facebook data, Twitter data, or LinkedIn data. For example, unique identifier unit 102 and/or network-participation identifier acceptor module 106 may accept a LinkedIn username as a network-participation identifier datum, wherein the username is associated with a public profile of a user of the business-related social networking site LinkedIn.

FIG. 10 illustrates alternative embodiments of the example operational flow 300 of FIGS. 3 and 9. FIG. 10 illustrates example embodiments where the accepting operation 902 may include at least one additional operation. Additional operations may include operation 1000, 1002, and/or operation 1004.

Operation 1000 depicts accepting social networking data corresponding to at least one verified real-world user of the at least one communication device, wherein the social networking data comprises at least one of image data, constellation of social contact data, or user input data. For example, unique identifier unit 102 and/or network-participation identifier acceptor module 106 may accept a list of social contacts from a social network such as Facebook or LinkedIn as the network-participation identifier data. In another example, unique identifier unit 102 and/or network-participation identifier acceptor module 106 may accept a list of email contacts grouped as friends or family from an email contact list as the network-participation identifier data.

Operation 1002 depicts accepting social networking data corresponding to at least one verified real-world user of the at least one communication device, wherein the social networking data comprises data accumulated from multiple sources. For example, unique identifier unit 102 and/or network-participation identifier acceptor module 106 may accept a plurality of usernames sourced from various social networks, each corresponding to the same verified real-world user of the at least one communication device as the data accumulated from multiple sources. As another example, unique identifier unit 102 and/or network-participation identifier acceptor module 106 may accept a set of photographs of the same verified real-world user of the at least one communication device, sourced from various social networks as the data accumulated from multiple sources.

Operation 1004 depicts accepting social networking data corresponding to at least one verified real-world user of the at least one communication device, wherein the social networking data comprises at least one of data used to create additional data or data used to find additional data. For example, unique identifier unit 102 and/or network-participation identifier acceptor module 106 may accept a website URL of a social networking site's videoconferencing or videochat feed as data (website URL) used to create additional data (streaming video of network participants). In another example, unique identifier unit 102 and/or network-participation identifier acceptor module 106 may accept a user image or alias that can be used to find other data, for example as a search term in an reverse-image query or a text query, respectively.

FIG. 11 illustrates alternative embodiments of the example operational flow 300 of FIG. 3. FIG. 11 illustrates example embodiments where the assigning operation 330 may include at least one additional operation. Additional operations may include operation 1100, 1102, and/or operation 1104.

Operation 1100 depicts assigning at least one of a multi-digit decimal number, a multi-digit hexadecimal number, or a randomized code as the unique identifier. For example, unique identifier unit 102 may assign at least one of a multi-digit decimal number, a multi-digit hexadecimal number, or a randomized code as the unique identifier. In another example, unique identifier unit 102 may assign a unique identifier using an algorithm(s) known in the art to generate unique multi-digit decimal numbers or unique multi-digit hexadecimal numbers. See, e.g., U.S. Pat. No. 8,010,587 (hereby incorporated by reference).

Operation 1102 depicts further comprising encrypting the unique identifier. For example, unique identifier unit 102 and/or encryption protocol logic 240 may encrypt the assigned unique identifier. Encrypting the unique identifier may be desirable in cases where telecommunications carriers sharing a directory comprised of unique identifiers for the purpose of locating and disambiguating users of one or more networks, can share the unique identifiers but still protect them and the underlying data from access by undesirable entities such as spammers and telemarketers. In another example, unique identifier unit 102 may encrypt the assigned identifier or associated sensitive personal and/or financial information according to encryption schemes described herein and known in the art. See, e.g., U.S. Pat. No. 8,010,791 and U.S. Pat. No. 8,010,786 (hereby incorporated by reference).

Operation 1104 depicts further comprising encrypting the unique identifier, wherein the encrypting the unique identifier includes performing at least one of symmetric key encryption, public key encryption, hybrid digital signature encryption, using a one-way hash function, using a random identifier, or using a pseudo-random identifier. For example, unique identifier unit 102 and/or encryption protocol logic 240 may encrypt the assigned unique identifier using a one-way hash function, which is easy to compute on every input, but hard to invert given the image of a random input.

FIG. 12 illustrates alternative embodiments of the example operational flow 300 of FIG. 3. FIG. 12 illustrates example embodiments where the assigning operation 330 may include at least one additional operation. Additional operations may include operation 1200, 1202, 1204, and/or operation 1206.

Operation 1200 depicts assigning a unique identifier at least partly based on the device-identifier data and the network-participation identifier data, further comprising assigning to the unique identifier geo-locator data from the at least one communication device. For example, unique identifier unit 102 may accept geodata 116 from a mobile phone, and then assign that geodata to an assigned unique identifier corresponding to a device and a network participant. In another example, unique identifier unit 102 may accept geodata 116 in the form of a computer's IP address, and then assign that geodata to an assigned unique identifier corresponding to the computer and a verified network participant associated with that computer.

Operation 1202 depicts assigning a unique identifier at least partly based on the device-identifier data and the network-participation identifier data, further comprising assigning to the unique identifier geo-locator data from the at least one communication device, wherein the geo-locator data is assigned via a global positioning satellite function of the communication device. For example, unique identifier unit 102 may accept geodata 116 from a mobile phone having a gps receiver, and then assign that geodata to an assigned unique identifier corresponding to a device and a network participant.

Operation 1204 depicts assigning a unique identifier at least partly based on the device-identifier data and the network-participation identifier data, further comprising assigning to the unique identifier geo-locator data from the at least one communication device, wherein the geo-locator data is derived from at least one of cellular phone tower proximity, Wi-Fi use, user-entered location data, or proximity to at least one other device. For example, unique identifier unit 102 may accept geodata 116 from a smart phone using a Wi-Fi network contained in a database that contains location information for the Wi-Fi network, and then assign that geodata to an assigned unique identifier corresponding to a device and a network participant.

Operation 1206 depicts assigning a unique identifier at least partly based on the device-identifier data and the network-participation identifier data, further comprising assigning to the unique identifier geo-locator data from the at least one communication device, wherein the geo-locator data is derived from at least one of a detected vehicle use, a detected user activity, or a detected user location. For example, unique identifier unit 102 may derive geo-locator data from detected automobile use, based on, for example, last known location and predicted range of travel of the automobile. In another example, unique identifier unit 102 may receive or deduce geo-locator data from a detected user activity, for example, checking in with foursquare at a specific location or searching for driving directions in a web browser, respectively.

FIG. 13 illustrates alternative embodiments of the example operational flow 300 of FIG. 3. FIG. 13 illustrates example embodiments where the assigning operation 330 may include at least one additional operation. Additional operations may include operation 1300, 1302, 1304, and/or operation 1306.

Operation 1300 depicts assigning a unique identifier at least partly based on the device-identifier data and the network-participation identifier data, wherein the unique identifier represents multiple communication devices associated with a single user. For example, unique identifier unit 102 may assign a unique identifier at least partly based on the device-identifier data and the network-participation identifier data, wherein the unique identifier represents multiple communication devices associated with a single user. In another example, unique identifier unit 102 may accept device-identifier data from a mobile phone, a desktop computer, and a laptop computer, each of which is associated with a single user, for example by virtue of an IMSI or other SIM data, email data, billing account data, or social networking data.

Operation 1302 depicts assigning a unique identifier at least partly based on the device-identifier data and the network-participation identifier data, wherein the unique identifier represents a single communication device associated with multiple users. For example, unique identifier unit 102 may assign a unique identifier at least partly based on the device-identifier data and the network-participation identifier data, wherein the unique identifier represents a single communication device associated with multiple users. In another example, unique identifier unit 102 may accept device-identifier data from a mobile phone, the device-identifier data associated with a multiple users, for example members of a family by virtue of different login data used for access to the device and/or different social networking usernames used on the device.

Operation 1304 depicts assigning a unique identifier at least partly based on the device-identifier data and the network-participation identifier data, wherein the unique identifier represents a single communication device associated with a single user. For example, unique identifier unit 102 may assign a unique identifier at least partly based on the device-identifier data and the network-participation identifier data, wherein the unique identifier represents a single communication device associated with a single user. As another example, unique identifier unit 102 may assign a unique identifier at least partly based on a videoconferencing device ID, such as an IP address or a MAC address, and at least partly based on a username and password for the videoconference, accompanied by a video image of a user associated with the username and password, verifying that a real-world user is associated with the videoconferencing device.

Operation 1306 depicts assigning a unique identifier at least partly based on the device-identifier data and the network-participation identifier data, and then adding an assigned unique identifier to an inter-service-provider directory of unique identifiers. For example, unique identifier unit 102 may assign a unique identifier at least partly based on the device-identifier data and the network-participation identifier data, and then adding an assigned unique identifier to an inter-service-provider directory of unique identifiers. In another example, unique identifier unit 102 may assign a unique identifier at least partly based on SIM data identifying a user's mobile phone, and at least partly based on the subscriber's participation in the wireless network, as verified, for example, by a social security number for the user on file with the wireless carrier for the mobile device, for example, Verizon. Verizon may similarly create unique identifiers for all of the other verified real-world users of its network and their associated devices. Other wireless carriers may similarly create unique identifiers for their subscribers and associated devices.

If many wireless carriers agree to share their unique identifier lists and keep them in the same format for use as a global directory of mobile phone users, a comprehensive "white pages" of communications device users becomes possible, across potentially all service providers. Such a directory could also be keyed to social networking data such as username or user image, such that, for example, Facebook users could easily find each other's device contact information and possibly location information. Inclusion of users' device information in such a directory could be done on an opt-in basis.

As used herein, a unique identifier based on a device-identifier and a network-participant identifier may be keyed to that underlying data. That is, having the unique identifier corresponding to specific device data and specific network-participation identifier data associated with a verified real-world user associated with the at least one communication device will permit the creator of the unique identifier to use it to call up the specific device data and specific network participation identifier data. This may allow, for example, a telecommunications carrier to disambiguate one user from another having similar or identical network participation identifier data. This can be done on the basis of different device identifier data for the two users with similar or identical network participation identifier data, for example.

FIG. 14 illustrates a partial view of an example article of manufacture 1400 that includes a computer program 1404 for executing a computer process on a computing device. An embodiment of the example article of manufacture 1400 is provided including a signal bearing medium 1402, and may include one or more instructions for accepting device-identifier data corresponding to at least one communication device; one or more instructions for accepting network-participation identifier data associated with a verified real-world user associated with the at least one communication device; and one or more instructions for assigning a unique identifier at least partly based on the device-identifier data and the network-participation identifier data. The one or more instructions may be, for example, computer executable and/or logic-implemented instructions. In one implementation, the signal-bearing medium 1402 may include a computer-readable medium 1406. In one implementation, the signal bearing medium 1402 may include a recordable medium 1408. In one implementation, the signal bearing medium 1402 may include a communications medium 1410.

FIG. 15 illustrates an example system 1500 in which embodiments may be implemented. The system 1500 includes a computing system environment. The system 1500 also illustrates a user 1512 using a device 1504, which is optionally shown as being in communication with a computing device 1502 by way of an optional coupling 1506. The optional coupling 1506 may represent a local, wide-area, or peer-to-peer network, or may represent a bus that is internal to a computing device (e.g., in example embodiments in which the computing device 1502 is contained in whole or in part within the device 1504). A storage medium 1508 may be any computer storage media. In one embodiment, the computing device 1502 may include a virtual machine operating within another computing device. In an alternative embodiment, the computing device 1502 may include a virtual machine operating within a program running on a remote server.

The computing device 1502 includes computer-executable instructions 1510 that when executed on the computing device 1502 cause the computing device 1502 to (a) accept device-identifier data corresponding to at least one communication device; (b) accept network-participation identifier data associated with a verified real-world user associated with the at least one communication device; and (c) assign a unique identifier at least partly based on the device-identifier data and the network-participation identifier data. As referenced above and as shown in FIG. 15, in some examples, the computing device 1502 may optionally be contained in whole or in part within the device 1504.

In FIG. 15, then, the system 1500 includes at least one computing device (e.g., 1502 and/or 1504). The computer-executable instructions 1510 may be executed on one or more of the at least one computing device. For example, the computing device 1502 may implement the computer-executable instructions 1510 and output a result to (and/or receive data from) the computing device 1504. Since the computing device 1502 may be wholly or partially contained within the computing device 1504, the device 1504 also may be said to execute some or all of the computer-executable instructions 1510, in order to be caused to perform or implement, for example, various ones of the techniques described herein, or other techniques.

The device 1504 may include, for example, a portable computing device, workstation, or desktop computing device. In another example embodiment, the computing device 1502 is operable to communicate with the device 1504 associated with the user 1512 to receive information about the input from the user 1512 for performing data access and data processing, and assign a unique identifier at least partly based on the device-identifier data and the network-participation identifier data.

FIG. 16 illustrates alternative embodiments of the example operational flow 300 of FIG. 3. FIG. 16 illustrates example embodiments where the accepting operation 320 may include at least one additional operation. Additional operations may include operation 1600, 1602, and/or operation 1604.

Operation 1600 depicts accepting network-participation identifier data associated with a verified real-world user associated with the at least one communication device, further comprising associating network-participation identifier data with a real-world user associated with the at least one communication device. To continue an example of operation 302 above in which unique identifier unit 102 and/or network-participation identifier acceptor module 106 may accept from Facebook a username associated with a verified real-world user having an iPhone and corresponding account with a telecommunications company, the unique identifier unit 102 and/or identity prediction module 122 may search one or more identity databases for associations between the username and a real-world user, and for associations between that real-world user and the iPhone. Sources of data for associating a user with network-participation data and/or a communication device may include, for example, information that is provided by the user. For example, social network, message boards, internet forums, and the like may contain a link between a username and a phone number, a real-world name, birth date, gender, age, or other identifying attribute. Private sources of data may also include information provided by the user, such as private social networks, ecommerce websites, or any websites to which a consumer provides sign-up information. Publicly available sources may contain unique consumer information, including for example, vehicle registration records, real estate records, driving records, voting records, political donations, health information, government related data, technographics, or any other on-line sources disclosing information about people. Examples of algorithms that may be employed to perform these associations can be found in U.S. Patent Application Publication 2010/0088313 "Data Source Attribution System," hereby incorporated in its entirety by reference. See also U.S. Patent Application Publication 2010/0010993 "Distributed Personal Information Aggregator," also hereby incorporated in its entirety by reference.

In the example above, the Facebook username may be used as a search query by identity prediction module 122 to find the same username on a blog containing a real-world name and mobile phone number associated with the username, the mobile phone number being assigned to the iPhone associated with the now-verified real-world user associated with the Facebook username.

Operation 1602 depicts associating network-participation identifier data with a real-world user associated with the at least one communication device, including at least one of performing the association using identity prediction, performing the association using de-anonymization, or performing the association using real-name profiling. For example, unique identifier unit 102, identity prediction module 122, de-anonymization module 244, and/or real-name profiling module 246 may associate network-participation identifier data with a real-world user associated with the at least one communication device, including at least one of performing the association using identity prediction, performing the association using de-anonymization, or performing the association using real-name profiling. For example, accept from LinkedIn the name of a person associated with a videoconferencing device and corresponding account with a videoconferencing service such as WebEx Web conferencing. If the association between the LinkedIn subscriber and a real-world user associated with the videoconferencing device is missing, identity prediction module 122 may search relevant identity databases for matches to the subscriber's username or other profile data. In this way, verification of the real-world user can be accomplished, and association between the network-participation identifier data and the user associated with the communications device can be performed.

Operation 1604 depicts associating network-participation identifier data with a real-world user associated with the at least one communication device, including at least one of performing the association using web history tracking, performing the association using media content tracking, or performing the association using app data tracking. For example, unique identifier unit 102, Web history tracking module 248, media content tracking module 250, and/or app data tracking module 252 may associate network-participation identifier data with a real-world user associated with the at least one communication device, including at least one of performing the association using web history tracking, performing the association using media content tracking, or performing the association using app data tracking. For example, unique identifier unit 102 may accept from Google the email address of a person associated with an Android phone and corresponding account with a wireless carrier. In this example, app data tracking module 252 may match the email address with device ID from the phone, e.g., SIM data, and make the association between the email address and the phone. Additionally, web history tracking module 248 may search public databases for verification that a real-world user is associated with the email address, for example by searching department of motor vehicle records or real estate records.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

Those having skill in the art will recognize that the state of the art has progressed to the point where there is little distinction left between hardware and software implementations of aspects of systems; the use of hardware or software is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit a device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Century Link, Southwestern Bell, etc.), or (g) a wired/wireless services entity (e.g., Sprint, Verizon, AT&T, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory.

Further, implementation of at least part of a system for performing a method in one territory does not preclude use of the system in another territory.

All of the above U.S. patents, U.S. patent application publications, U.S. patent applications, foreign patents, foreign patent applications and non-patent publications referred to in this specification and/or listed in any Application Data Sheet are incorporated herein by reference, to the extent not inconsistent herewith.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system, comprising:
    circuitry for maintaining one or more unique identifiers corresponding to one or more vehicles, a unique identifier corresponding to a vehicle associated with at least a first network-participation identifier indicative of a first communication device associated with the vehicle and a first geo-locator derived from the first communication device associated with the vehicle, the first network-participation identifier indicative of the first communication device associated with the vehicle linked with an image of a user of the first communication device associated with the vehicle;
    circuitry for accepting at least (i) a second geo-locator derived from at least one positioning function of a second communication device, (ii) device-identifier data corresponding to the second communication device, and (iii) a second network-participation identifier indicative of a user associated with the second communication device;

circuitry for obtaining, from the one or more unique identifiers, a vehicle result at least partly based on the second geo-locator, the device-identifier data corresponding to the second communication device, and the second network-participation identifier;

circuitry for linking the first geo-locator derived from the first communication device associated with the vehicle to a travel prediction of the vehicle at least partly based on the vehicle result obtained from the one or more unique identifiers;

circuitry for accepting at least one image indicative of a current user of the first communication device associated with the vehicle;

circuitry for using image recognition of the at least one image of the current user of the first communication device associated with the vehicle to determine whether the current user of the first communication device associated with the vehicle is the user of the first communication device associated with the vehicle at least partly based on the image of the user of the first communication device associated with the vehicle linked with the network-participation identifier indicative of the first communication device; and circuitry for providing location information associated with the second geo-locator to the first communication device associated with the vehicle responsive to the image recognition.

2. The system of claim 1, wherein circuitry for accepting at least (i) a second geo-locator derived from at least one positioning function of a second communication device, (ii) device-identifier data corresponding to the second communication device, and (iii) a second network-participation identifier indicative of a user associated with the second communication device comprises:

circuitry for accepting the device-identifier data corresponding to the second communication device, the second communication device including at least one of a mobile phone, a wired telephone, a voice-over-internet-protocol telephone, a tablet computer, a notebook computer, a laptop computer, a desktop computer, or a networked television.

3. The system of claim 1, wherein circuitry for accepting at least (i) a second geo-locator derived from at least one positioning function of a second communication device, (ii) device-identifier data corresponding to the second communication device, and (iii) a second network-participation identifier indicative of a user associated with the second communication device comprises:

circuitry for accepting the device-identifier data corresponding to the second communication device, including at least accepting at least one telephone number as the device-identifier data corresponding to at least one telephony device as the second communication device.

4. The system of claim 1, wherein circuitry for accepting at least (i) a second geo-locator derived from at least one positioning function of a second communication device, (ii) device-identifier data corresponding to the second communication device, and (iii) a second network-participation identifier indicative of a user associated with the second communication device comprises:

circuitry for accepting the device-identifier data corresponding to the second communication device, including at least one of subscriber identity module data or integrated circuit card identifier data corresponding to the second communication device.

5. The system of claim 1, wherein circuitry for accepting at least (i) a second geo-locator derived from at least one positioning function of a second communication device, (ii) device-identifier data corresponding to the second communication device, and (iii) a second network-participation identifier indicative of a user associated with the second communication device comprises:

circuitry for accepting the device-identifier data, including at least one of mobile equipment identifier data, electronic serial number data, international mobile equipment identity data, or international mobile subscriber identity data corresponding to the second communication device.

6. The system of claim 1, wherein circuitry for accepting at least (i) a second geo-locator derived from at least one positioning function of a second communication device, (ii) device-identifier data corresponding to the second communication device, and (iii) a second network-participation identifier indicative of a user associated with the second communication device comprises:

circuitry for accepting the device-identifier data, including at least an IP address corresponding to the second communication device.

7. The system of claim 1, wherein circuitry for accepting at least (i) a second geo-locator derived from at least one positioning function of a second communication device, (ii) device-identifier data corresponding to the second communication device, and (iii) a second network-participation identifier indicative of a user associated with the second communication device comprises:

circuitry for accepting the device-identifier data, including at least accepting data corresponding to the second communication device that is linked to at least one billing account.

8. The system of claim 7, wherein circuitry for accepting the device-identifier data, including at least accepting data corresponding to the second communication device that is linked to at least one billing account comprises:

circuitry for accepting the device-identifier data, including at least accepting data corresponding to the second communication device that is linked to one or more of at least one cable telecommunications billing account or at least one telecommunications billing account.

9. The system of claim 7, wherein circuitry for accepting the device-identifier data, including at least accepting data corresponding to the second communication device that is linked to at least one billing account comprises:

circuitry for accepting the device-identifier data, including at least accepting a mobile equipment identifier from a SIM card associated with the second communication device; and circuitry for providing a link to at least one wireless telecommunications billing account associated with the accepted mobile equipment identifier, the link to at least one wireless telecommunications billing account operable to provide a name of an account holder associated with the at least one wireless telecommunications billing account as a verified real-world user.

10. The system of claim 7, wherein circuitry for accepting the device-identifier data, including at least accepting data corresponding to the second communication device that is linked to at least one billing account comprises:

circuitry for accepting the device-identifier data, including at least accepting data corresponding to the second communication device that is linked to at least one physical address.

11. The system of claim 7, wherein circuitry for accepting the device-identifier data, including at least accepting data corresponding to the second communication device that is linked to at least one billing account comprises:
 circuitry for accepting the device-identifier data, including at least accepting a mobile equipment identifier from a SIM card associated with the second communication device; and
 circuitry for providing a link to at least one wireless telecommunications billing account associated with the accepted mobile equipment identifier and linked with at least one bank account, the link with at least one bank account operable to provide a name of an account holder associated with the at least one bank account as a verified real-world user.

12. The system of claim 7, wherein circuitry for accepting the device-identifier data, including at least accepting data corresponding to the second communication device that is linked to at least one billing account comprises:
 circuitry for accepting the device-identifier data, including at least accepting data corresponding to the second communication device that is linked to at least one electronic payment account.

13. The system of claim 12, wherein circuitry for accepting the device-identifier data, including at least accepting data corresponding to at least one communication device that is linked to at least one electronic payment account comprises:
 circuitry for accepting the device-identifier data, including at least accepting data corresponding to the second communication device that is linked to one or more of at least one Google Checkout account, at least one Amazon Payments account, at least one PayPal account, or at least one mobile PayPal account.

14. The system of claim 7, wherein circuitry for accepting the device-identifier data, including at least accepting data corresponding to the second communication device that is linked to at least one billing account comprises:
 circuitry for accepting the device-identifier data, including at least accepting data corresponding to the second communication device that is linked to at least one credit card account.

15. The system of claim 7, wherein circuitry for accepting the device-identifier data, including at least accepting data corresponding to the second communication device that is linked to at least one billing account comprises:
 circuitry for accepting the device-identifier data, including at least accepting data corresponding to the second communication device that is linked to at least one virtual account.

16. The system of claim 1, wherein circuitry for accepting at least (i) a second geo-locator derived from at least one positioning function of a second communication device, (ii) device-identifier data corresponding to the second communication device, and (iii) a second network-participation identifier indicative of a user associated with the second communication device comprises:
 circuitry for accepting the network-participation identifier data, including at least accepting social networking data corresponding to at least one verified real-world user of the second communication device.

17. The system of claim 16, wherein circuitry for accepting the network-participation identifier data, including at least accepting social networking data corresponding to at least one verified real-world user of the second communication device comprises:
 circuitry for accepting one or more of at least one username, at least one @-tagged twitter handle, at least one corporate login, or at least one website universal resource locator.

18. The system of claim 16, wherein circuitry for accepting the network-participation identifier data, including at least accepting social networking data corresponding to at least one verified real-world user of the second communication device comprises:
 circuitry for accepting one or more of at least some Facebook data, at least some Twitter data, or at least some LinkedIn data corresponding to at least one verified real-world user of the second communication device.

19. The system of claim 16, wherein circuitry for accepting the network-participation identifier data, including at least accepting social networking data corresponding to at least one verified real-world user of the second communication device comprises:
 circuitry for accepting one or more of at least some image data, at least one constellation of social contact data, or at least some user input data corresponding to at least one verified real-world user of the second communication device.

20. The system of claim 16, wherein circuitry for accepting the network-participation identifier data, including at least accepting social networking data corresponding to at least one verified real-world user of the second communication device comprises:
 circuitry for accepting data accumulated from multiple sources corresponding to at least one verified real-world user of the second communication device.

21. The system of claim 16, wherein circuitry for accepting the network-participation identifier data, including at least accepting social networking data corresponding to at least one verified real-world user of the second communication device comprises:
 circuitry for accepting one or more of at least some data used to create additional data or at least some data used to find additional data corresponding to at least one verified real-world user of the second communication device.

22. The system of claim 1, wherein circuitry for accepting at least (i) a second geo-locator derived from at least one positioning function of a second communication device, (ii) device-identifier data corresponding to the second communication device, and (iii) a second network-participation identifier indicative of a user associated with the second communication device comprises:
 circuitry for associating network-participation data with a real-world user associated with the second communication device including at least performing the association using one or more of identity prediction, de-anonymization, or real-name profiling.

23. The system of claim 1, wherein circuitry for accepting at least (i) a second geo-locator derived from at least one positioning function of a second communication device, (ii) device-identifier data corresponding to the second communication device, and (iii) a second network-participation identifier indicative of a user associated with the second communication device comprises:
 circuitry for associating network-participation data with a real-world user associated with the second communication device including at least performing the association using one or more of web history tracking, media content tracking, or app data tracking.

24. The system of claim 1, wherein circuitry for obtaining, from the one or more unique identifiers, a vehicle result at least partly based on the second geo-locator, the device-identifier data corresponding to the second communication device, and the second network-participation identifier comprises:
    circuitry for obtaining the unique identifier at least partly based on the first geo-locator and the second geo-locator.

25. The system of claim 24, wherein circuitry for obtaining the unique identifier at least partly based on the first geo-locator and the second geo-locator comprises:
    circuitry for obtaining the unique identifier at least partly based on the predicted range of travel of the vehicle associated with the first geo-locator and at least partly based on the second geo-locator.

26. The system of claim 1, wherein circuitry for obtaining, from the one or more unique identifiers, a vehicle result at least partly based on the second geo-locator, the device-identifier data corresponding to the second communication device, and the second network-participation identifier comprises:
    circuitry for assigning multiple unique identifiers representing multiple communication devices associated with multiple users with identical network-participation identifier data, the identical network-participation identifier data including at least a social networking account username.

27. The system of claim 1, wherein circuitry for obtaining, from the one or more unique identifiers, a vehicle result at least partly based on the second geo-locator, the device-identifier data corresponding to the second communication device, and the second network-participation identifier comprises:
    circuitry for assigning a unique identifier representing a single communication device associated with multiple users.

28. The system of claim 1, wherein circuitry for obtaining, from the one or more unique identifiers, a vehicle result at least partly based on the second geo-locator, the device-identifier data corresponding to the second communication device, and the second network-participation identifier comprises:
    circuitry for assigning a unique identifier representing a single communication device associated with a single user.

29. A system, comprising:
    one or more computing devices; and
    one or more instructions that, when executed by at least one computing device, cause at least some of the one or more computing devices to perform one or more operations including at least:
        maintaining one or more unique identifiers corresponding to one or more vehicles, a unique identifier corresponding to a vehicle associated with at least a first network-participation identifier indicative of a first communication device associated with the vehicle and a first geo-locator derived from the first communication device associated with the vehicle, the first network-participation identifier indicative of the first communication device associated with the vehicle linked with an image of a user of the first communication device associated with the vehicle;
        accepting at least (i) a second geo-locator derived from at least one positioning function of a second communication device, (ii) device-identifier data corresponding to the second communication device, and (iii) a second network-participation identifier indicative of a user associated with the second communication device;
        obtaining, from the one or more unique identifiers, a vehicle result at least partly based on the second geo-locator, the device-identifier data corresponding to the second communication device, and the second network-participation identifier;
        linking the first geo-locator derived from the first communication device associated with the vehicle to a travel prediction of the vehicle at least partly based on the vehicle result obtained from the one or more unique identifiers;
        accepting at least one image indicative of a current user of the first communication device associated with the vehicle;
        using image recognition of the at least one image of the current user of the first communication device associated with the vehicle to determine whether the current user of the first communication device associated with the vehicle is the user of the first communication device associated with the vehicle at least partly based on the image of the user of the first communication device associated with the vehicle linked with the network-participation identifier indicative of the first communication device; and
        providing location information associated with the second geo-locator to the first communication device associated with the vehicle responsive to the image recognition.

30. The system of claim 29, wherein the one or more computing devices comprise:
    one or more of at least one personal digital assistant (PDA), at least one personal entertainment device, at least one mobile phone, at least one laptop computer, at least one tablet personal computer, at least one on-board vehicle computer, at least one networked computer, at least one computing system comprised of at least one cluster of processors, at least one computing system comprised of at least one cluster of servers, at least one workstation computer, or at least one desktop computer.

31. The system of claim 29, wherein at least one computing device is operable to perform the one or more operations including at least maintaining one or more unique identifiers corresponding to one or more vehicles, a unique identifier corresponding to a vehicle associated with at least a first network-participation identifier indicative of a first communication device associated with the vehicle and a first geo-locator derived from the first communication device associated with the vehicle, the first network-participation identifier indicative of the first communication device associated with the vehicle linked with an image of a user of the first communication device associated with the vehicle, accepting at least (i) a second geo-locator derived from at least one positioning function of a second communication device, (ii) device-identifier data corresponding to the second communication device, and (iii) a second network-participation identifier indicative of a user associated with the second communication device, obtaining, from the one or more unique identifiers, a vehicle result at least partly based on the second geo-locator, the device-identifier data corresponding to the second communication device, and the second network-participation identifier, linking the first geo-locator derived from the first communication device associated with the vehicle to a travel prediction of the vehicle at least partly based on the vehicle result obtained from the one or more unique identifiers, accepting at least one image indicative of a current user of the first communication device associated with the vehicle, using image recognition of the at least one image of the current user of the first communication device associated with the vehicle to determine whether the current user of the first communication device associated with the vehicle is the user of the first communication device associated with the vehicle at least partly based on the image of the user of the first communication device associated with the vehicle linked with the network-participation identifier indicative of the first communication device, and providing location information associated with the second geo-locator to the first communication device associated with the vehicle responsive to the image recognition from at least one memory.

32. The system of claim 1, wherein circuitry for linking the first geo-locator derived from the first communication device associated with the vehicle to a travel prediction of the vehicle at least partly based on the vehicle result obtained from the one or more unique identifiers comprises:
circuitry for linking to the unique identifier at least some geo-locator data obtained via at least one positioning function of the first communication device.

33. The system of claim 1, wherein circuitry for linking the first geo-locator derived from the first communication device associated with the vehicle to a travel prediction of the vehicle at least partly based on the vehicle result obtained from the one or more unique identifiers comprises:
circuitry for linking the first geo-locator derived from the first communication device associated with the vehicle to a travel prediction of the vehicle at least partly based on at least some location information for at least one Wi-Fi network with which the second communication device is associated.

34. The system of claim 1, wherein circuitry for linking the first geo-locator derived from the first communication device associated with the vehicle to a travel prediction of the vehicle at least partly based on the vehicle result obtained from the one or more unique identifiers comprises:
circuitry for linking the first geo-locator derived from the first communication device associated with the vehicle to a travel prediction of the vehicle at least partly based on at least some location data entered via at least one user interface of the second communication device.

35. The system of claim 1, wherein circuitry for providing location information associated with the second geo-locator to the first communication device associated with the vehicle responsive to the image recognition comprises:
circuitry for providing vehicle location information associated with the second geo-locator responsive to a social networking query related to the network-participation identifier data.

36. The system of claim 1, wherein circuitry for providing location information associated with the second geo-locator to the first communication device associated with the vehicle responsive to the image recognition comprises:
circuitry for providing location information associated with the second geo-locator in association with a query of an inter-service-provider directory of unique identifiers.

37. A method, comprising:
maintaining one or more unique identifiers corresponding to one or more vehicles, a unique identifier corresponding to a vehicle associated with at least a first network-participation identifier indicative of a first communication device associated with the vehicle and a first geo-locator derived from the first communication device associated with the vehicle, the first network-participation identifier indicative of the first communication device associated with the vehicle linked with an image of a user of the first communication device associated with the vehicle;
accepting at least (i) a second geo-locator derived from at least one positioning function of a second communication device, (ii) device-identifier data corresponding to the second communication device, and (iii) a second network-participation identifier indicative of a user associated with the second communication device;
obtaining, from the one or more unique identifiers, a vehicle result at least partly based on the second geo-locator, the device-identifier data corresponding to the second communication device, and the second network-participation identifier;
linking the first geo-locator derived from the first communication device associated with the vehicle to a travel prediction of the vehicle at least partly based on the vehicle result obtained from the one or more unique identifiers;
accepting at least one image indicative of a current user of the first communication device associated with the vehicle;
using image recognition of the at least one image of the current user of the first communication device associated with the vehicle to determine whether the current user of the first communication device associated with the vehicle is the user of the first communication device associated with the vehicle at least partly based on the image of the user of the first communication device associated with the vehicle linked with the network-participation identifier indicative of the first communication device; and
providing location information associated with the second geo-locator to the first communication device associated with the vehicle responsive to the image recognition,
wherein at least one of the maintaining, accepting, obtaining, linking, using, or providing is at least partly implemented using at least one processing device.

38. The system of claim 1, wherein circuitry for maintaining one or more unique identifiers corresponding to one or more vehicles, a unique identifier corresponding to a vehicle associated with at least a first network-participation identifier indicative of a first communication device associated with the vehicle and a first geo-locator derived from the first communication device associated with the vehicle, the first network-participation identifier indicative of the first communication device associated with the vehicle linked with an image of a user of the first communication device associated with the vehicle comprises:
circuitry for receiving an indication of the first network-participation identifier indicative of the first communication device associated with the vehicle;
circuitry for searching the one or more unique identifiers corresponding to one or more vehicles using the indication of the first network-participation identifier indicative of the first communication device associated with the vehicle as a search term; and
circuitry for storing a newly-assigned unique identifier if the search does not result in a previously-assigned unique identifier.

39. The system of claim 1, wherein circuitry for maintaining one or more unique identifiers corresponding to one or more vehicles, a unique identifier corresponding to a vehicle associated with at least a first network-participation identifier indicative of a first communication device associated with the vehicle and a first geo-locator derived from the first communication device associated with the vehicle, the first network-participation identifier indicative of the first communication device associated with the vehicle linked with an image of a user of the first communication device associated with the vehicle comprises:
    circuitry for maintaining a data structure of one or more unique identifiers corresponding to one or more vehicles, the data structure operable to return one or more unique identifiers corresponding to one or more vehicles associated with a particular geographic location responsive to a search query using a geo-locator as a search term.

40. The system of claim 1, wherein circuitry for maintaining one or more unique identifiers corresponding to one or more vehicles, a unique identifier corresponding to a vehicle associated with at least a first network-participation identifier indicative of a first communication device associated with the vehicle and a first geo-locator derived from the first communication device associated with the vehicle, the first network-participation identifier indicative of the first communication device associated with the vehicle linked with an image of a user of the first communication device associated with the vehicle comprises:
    circuitry for maintaining a data structure of one or more unique identifiers corresponding to one or more vehicles, a unique identifier corresponding to a vehicle associated with at least a first network-participation identifier indicative of a first communication device associated with the vehicle and a first geo-locator at least partly based on data from a satellite positioning sensor of the first communication device associated with the vehicle.

41. The system of claim 1, wherein circuitry for maintaining one or more unique identifiers corresponding to one or more vehicles, a unique identifier corresponding to a vehicle associated with at least a first network-participation identifier indicative of a first communication device associated with the vehicle and a first geo-locator derived from the first communication device associated with the vehicle, the first network-participation identifier indicative of the first communication device associated with the vehicle linked with an image of a user of the first communication device associated with the vehicle comprises:
    circuitry for maintaining a data structure of one or more unique identifiers corresponding to one or more vehicles, a unique identifier corresponding to a vehicle associated with at least a first social-network username indicative of a first communication device associated with the vehicle and a first geo-locator derived from the first communication device associated with the vehicle.

42. The system of claim 1, wherein circuitry for linking the first geo-locator derived from the first communication device associated with the vehicle to a travel prediction of the vehicle at least partly based on the vehicle result obtained from the one or more unique identifiers comprises:
    circuitry for linking the first geo-locator derived from the first communication device associated with the vehicle to a travel prediction of the vehicle at least partly based on a last known location of the vehicle indicated by the vehicle result obtained from the one or more unique identifiers.

43. The system of claim 1, wherein circuitry for linking the first geo-locator derived from the first communication device associated with the vehicle to a travel prediction of the vehicle at least partly based on the vehicle result obtained from the one or more unique identifiers comprises:
    circuitry for linking the first geo-locator derived from the first communication device associated with the vehicle to a travel prediction of the vehicle at least partly based on at least one search for driving directions from the vehicle indicated by the vehicle result obtained from the one or more unique identifiers.

44. The system of claim 1, wherein circuitry for linking the first geo-locator derived from the first communication device associated with the vehicle to a travel prediction of the vehicle at least partly based on the vehicle result obtained from the one or more unique identifiers comprises:
    circuitry for linking the first geo-locator derived from the first communication device associated with the vehicle to a travel prediction of the vehicle at least partly based on a predicted range of travel of the vehicle indicated by the vehicle result obtained from the one or more unique identifiers.

45. The system of claim 1, wherein circuitry for providing location information associated with the second geo-locator to the first communication device associated with the vehicle responsive to the image recognition comprises:
    circuitry for providing a current position of a user associated with the second communication device indicated by the second network-participation identifier to the first communication device associated with the vehicle responsive to the image recognition.

46. The system of claim 1, wherein circuitry for accepting at least one image indicative of a current user of the first communication device associated with the vehicle comprises:
    circuitry for accepting at least one image indicative of a current user of the first communication device associated with the vehicle subsequent to transmitting a request to the first communication device associated with the vehicle for a current image of a user of the first communication device associated with the vehicle.

47. The system of claim 1, wherein circuitry for using image recognition of the at least one image of the current user of the first communication device associated with the vehicle to determine whether the current user of the first communication device associated with the vehicle is the user of the first communication device associated with the vehicle at least partly based on the image of the user of the first communication device associated with the vehicle linked with the network-participation identifier indicative of the first communication device comprises:
    circuitry for retrieving the image of the user of the first communication device associated with the vehicle at least partly based on the network-participation identifier indicative of the first communication device;
    circuitry for comparing the accepted at least one image indicative of a current user of the first communication device associated with the vehicle with the retrieved image of the user of the first communication device associated with the vehicle; and
    circuitry for identifying the current user of the first communication device associated with the vehicle as the user of the first communication device associated with the vehicle linked with the first network-participation identifier indicative of the first communication device associated with the vehicle at least partly based on the comparing.

48. The system of claim 1, wherein circuitry for accepting at least one image indicative of a current user of the first communication device associated with the vehicle comprises:
    circuitry for accepting at least one image indicative of a current user of the first communication device associated with the vehicle, the at least one image indicative of the current user of the first communication device including at least one image captured by the current user of the first communication device using an image sensor of the first communication device.

49. The system of claim 48, wherein circuitry for accepting at least one image indicative of a current user of the first communication device associated with the vehicle, the at least one image indicative of the current user of the first communication device including at least one image captured by the current user of the first communication device using an image sensor of the first communication device comprises:
    circuitry for accepting at least one image indicative of a current user of the first communication device associated with the vehicle, the at least one image indicative of the current user of the first communication device including at least one fingerprint image captured by the current user of the first communication device using a fingerprint image sensor of the first communication device.

\* \* \* \* \*